United States Patent
Brosius et al.

(10) Patent No.: US 9,842,577 B2
(45) Date of Patent: Dec. 12, 2017

(54) IMPROVISED GUITAR SIMULATION

(71) Applicant: Harmonix Music Systems, Inc., Boston, MA (US)

(72) Inventors: Eric J. Brosius, Arlington, MA (US); Ryan Challinor, Cambridge, MA (US); Ethan Fenn, Cambridge, MA (US); Gregory B. Lopiccolo, Brookline, MA (US); Matthew Tytel, Somerville, MA (US); Steven Pardo, Somerville, MA (US); Christopher Wilson, Salem, MA (US)

(73) Assignee: HARMONIX MUSIC SYSTEMS, INC., Boston, MA (US)

( * ) Notice: Subject to any disclaimer, the term of this patent is extended or adjusted under 35 U.S.C. 154(b) by 0 days.

(21) Appl. No.: 15/159,176

(22) Filed: May 19, 2016

(65) Prior Publication Data

US 2016/0343362 A1 Nov. 24, 2016

Related U.S. Application Data

(60) Provisional application No. 62/163,503, filed on May 19, 2015.

(51) Int. Cl.
*G10H 1/34* (2006.01)
*G10H 1/00* (2006.01)
(Continued)

(52) U.S. Cl.
CPC ............. *G10H 1/342* (2013.01); *A63F 13/46* (2014.09); *A63F 13/814* (2014.09);
(Continued)

(58) Field of Classification Search
CPC ...... G10H 1/342; G10H 1/0016; A63F 13/46; A63F 13/814
(Continued)

(56) References Cited

U.S. PATENT DOCUMENTS 3,897,711 A * 8/1975 Elledge .................. G09B 15/02
84/479 R 4,128,037 A * 12/1978 Montemurro ........ G09B 15/026
84/476
(Continued)

FOREIGN PATENT DOCUMENTS

DE 19833989 A1 2/2000
EP 1 029 566 A2 8/2000
(Continued)

OTHER PUBLICATIONS

"HF Transceiver and Receiver VFO Calibration: Methods #1 and #2", http://web.archive.org/web/20071119171602/http://www.hflink.com/calibration/, accessed May 21, 2012 (2 pages).
(Continued)

*Primary Examiner* — David Warren
*Assistant Examiner* — Christina Schreiber
(74) *Attorney, Agent, or Firm* — Wilmer Cutler Pickering Hale and Dorr LLP

(57) ABSTRACT

The present disclosure is directed at methods, apparatus and systems for implementing an improvised guitar playing feature on a rhythm-action game. The improvised guitar playing feature allows players to manipulate a guitar controller to produce a pleasing, musical-sounding improvised play even if the players have little experience or skill at improvising music. This feature uses quantized $8^{th}$ and $16^{th}$ note musical phrases, or "licks", strung together to form authentic, melodic, and rhythmically musical and impressive guitar lines, regardless of the player's ability. The improvised guitar playing feature can also display cues directing the player to improvise in a certain manner, while still providing players a degree of musical freedom in selecting how to play. In some embodiments, the present disclosure is also directed at scoring mechanisms for evaluating improvised guitar play.

20 Claims, 13 Drawing Sheets

(51) Int. Cl.
   *A63F 13/46* (2014.01)
   *A63F 13/814* (2014.01)
(52) U.S. Cl.
   CPC ..... *G10H 1/0016* (2013.01); *G10H 2210/076* (2013.01); *G10H 2210/141* (2013.01); *G10H 2220/135* (2013.01); *G10H 2220/191* (2013.01); *G10H 2220/391* (2013.01); *G10H 2230/135* (2013.01)
(58) Field of Classification Search
   USPC .......................................................... 84/609
   See application file for complete search history.

(56) References Cited

U.S. PATENT DOCUMENTS

| | | | |
|---|---|---|---|
| 4,295,406 A | 10/1981 | Smith | |
| 4,794,838 A | 1/1989 | Corrigau, III | |
| 5,109,482 A * | 4/1992 | Bohrman | G09B 5/065 715/723 |
| 5,140,889 A | 8/1992 | Segan et al. | |
| 5,393,926 A * | 2/1995 | Johnson | G10H 1/0066 84/610 |
| 5,469,370 A | 11/1995 | Ostrover et al. | |
| 5,510,573 A | 4/1996 | Cho et al. | |
| 5,513,129 A | 4/1996 | Bolas et al. | |
| 5,557,057 A | 9/1996 | Starr | |
| 5,739,457 A | 4/1998 | Devecka | |
| 5,777,251 A | 7/1998 | Hotta et al. | |
| 5,990,407 A * | 11/1999 | Gannon | G10H 1/0025 84/604 |
| 6,075,197 A | 6/2000 | Chan | |
| 6,111,179 A | 8/2000 | Miller | |
| 6,162,981 A | 12/2000 | Newcomer et al. | |
| 6,225,547 B1 | 5/2001 | Toyama et al. | |
| 6,252,153 B1 | 6/2001 | Toyama | |
| 6,268,557 B1 | 7/2001 | Devecka | |
| 6,342,665 B1 | 1/2002 | Okita et al. | |
| 6,347,998 B1 | 2/2002 | Yoshitomi et al. | |
| 6,369,313 B2 | 4/2002 | Devecka | |
| 6,379,244 B1 | 4/2002 | Sagawa et al. | |
| 6,390,923 B1 | 5/2002 | Yoshitomi et al. | |
| 6,410,835 B2 | 6/2002 | Suzuki et al. | |
| 6,425,822 B1 | 7/2002 | Hayashida et al. | |
| 6,438,611 B1 | 8/2002 | Hara et al. | |
| 6,461,239 B1 | 10/2002 | Sagawa et al. | |
| 6,482,087 B1 | 11/2002 | Egozy et al. | |
| 6,483,018 B2 | 11/2002 | Mead | |
| 6,541,692 B2 | 4/2003 | Miller | |
| 6,555,737 B2 | 4/2003 | Miyaki et al. | |
| 6,645,067 B1 | 11/2003 | Okita et al. | |
| 6,653,545 B2 | 11/2003 | Redmann et al. | |
| 6,663,491 B2 | 12/2003 | Watabe et al. | |
| 6,685,480 B2 | 2/2004 | Nishimoto et al. | |
| 6,699,123 B2 | 3/2004 | Matsuura et al. | |
| 6,835,887 B2 | 12/2004 | Devecka | |
| 6,850,252 B1 | 2/2005 | Hoffberg | |
| 6,867,358 B1 * | 3/2005 | Mester, Jr. | G10H 1/0025 84/602 |
| 6,905,413 B1 | 6/2005 | Terao et al. | |
| 6,924,425 B2 | 8/2005 | Naples et al. | |
| 6,936,758 B2 | 8/2005 | Itoh | |
| 6,987,221 B2 | 1/2006 | Platt | |
| 7,078,607 B2 | 7/2006 | Alferness | |
| 7,083,519 B2 | 8/2006 | Toyoshima | |
| 7,164,076 B2 | 1/2007 | McHale et al. | |
| 7,208,672 B2 | 4/2007 | Camiel | |
| 7,220,910 B2 | 5/2007 | Plastina et al. | |
| 7,223,913 B2 | 5/2007 | Knapp et al. | |
| 7,232,949 B2 | 6/2007 | Hruska et al. | |
| 7,320,643 B1 * | 1/2008 | Brosius | A63F 13/06 463/37 |
| D569,382 S | 5/2008 | Yow et al. | |
| 7,459,324 B1 | 12/2008 | Ptasinski et al. | |
| 7,459,624 B2 | 12/2008 | Schmidt et al. | |
| 7,525,036 B2 | 4/2009 | Shotwell et al. | |
| 7,559,834 B1 | 7/2009 | York | |
| 7,789,741 B1 | 9/2010 | Fields et al. | |
| 7,840,288 B2 | 11/2010 | Graepel et al. | |
| 7,855,333 B2 | 12/2010 | Miyajima et al. | |
| 7,855,334 B2 | 12/2010 | Yamashita et al. | |
| 7,935,880 B2 * | 5/2011 | Stoddard | G10H 1/368 84/609 |
| 7,982,114 B2 | 7/2011 | Applewhite et al. | |
| 8,003,872 B2 | 8/2011 | Lopiccolo et al. | |
| 8,017,857 B2 * | 9/2011 | Chiu | A63F 13/02 84/609 |
| 8,026,435 B2 | 9/2011 | Stoddard et al. | |
| 8,076,574 B2 | 12/2011 | Irmer et al. | |
| 8,080,722 B2 * | 12/2011 | Applewhite | G10H 1/368 84/477 R |
| 8,173,883 B2 | 5/2012 | Willacy et al. | |
| 8,198,526 B2 | 6/2012 | Izen et al. | |
| 8,324,494 B1 | 12/2012 | Packouz | |
| 8,449,360 B2 | 5/2013 | Stoddard et al. | |
| 8,663,013 B2 | 3/2014 | Egozy et al. | |
| 8,690,670 B2 | 4/2014 | Kay et al. | |
| 8,847,053 B2 | 9/2014 | Humphrey et al. | |
| 9,033,795 B2 | 5/2015 | Yum | |
| 9,324,216 B2 | 4/2016 | Janosov | |
| 2002/0002900 A1 | 1/2002 | Cho | |
| 2002/0025842 A1 | 2/2002 | Nobe et al. | |
| 2002/0032054 A1 | 3/2002 | Hosoya | |
| 2002/0088337 A1 | 7/2002 | Devecka | |
| 2002/0128736 A1 | 9/2002 | Yoshida et al. | |
| 2002/0142818 A1 | 10/2002 | Nakatsuka et al. | |
| 2002/0160824 A1 | 10/2002 | Goto et al. | |
| 2002/0169014 A1 | 11/2002 | Egozy et al. | |
| 2003/0014262 A1 | 1/2003 | Kim | |
| 2003/0083130 A1 | 5/2003 | Toyoshima | |
| 2003/0164084 A1 | 9/2003 | Redmann et al. | |
| 2004/0060423 A1 * | 4/2004 | Clynes | G10H 1/44 84/609 |
| 2004/0132518 A1 | 7/2004 | Uehara et al. | |
| 2004/0148159 A1 | 7/2004 | Crockett et al. | |
| 2004/0229685 A1 | 11/2004 | Smith et al. | |
| 2004/0244566 A1 | 12/2004 | Steiger | |
| 2005/0070359 A1 | 3/2005 | Rodriquez et al. | |
| 2005/0101364 A1 | 5/2005 | Onoda et al. | |
| 2005/0120865 A1 | 6/2005 | Tada | |
| 2005/0235809 A1 | 10/2005 | Kageyama | |
| 2005/0255914 A1 | 11/2005 | McHale et al. | |
| 2005/0273319 A1 | 12/2005 | Dittmar et al. | |
| 2006/0058101 A1 | 3/2006 | Rigopulos | |
| 2006/0127053 A1 | 6/2006 | Lee | |
| 2006/0191401 A1 | 8/2006 | Ueshima et al. | |
| 2006/0205506 A1 | 9/2006 | Toyoshima | |
| 2006/0258450 A1 | 11/2006 | Ishihata et al. | |
| 2006/0266200 A1 | 11/2006 | Goodwin | |
| 2006/0287106 A1 | 12/2006 | Jensen | |
| 2006/0290810 A1 | 12/2006 | Mallinson | |
| 2007/0015571 A1 | 1/2007 | Walker et al. | |
| 2007/0059670 A1 | 3/2007 | Yates | |
| 2007/0081562 A1 | 4/2007 | Ma | |
| 2007/0087835 A1 | 4/2007 | Van Luchene | |
| 2007/0111802 A1 | 5/2007 | Ishihara et al. | |
| 2007/0140510 A1 | 6/2007 | Redmann | |
| 2007/0163427 A1 | 7/2007 | Rigopulos et al. | |
| 2007/0163428 A1 | 7/2007 | Salter | |
| 2007/0232374 A1 * | 10/2007 | Lopiccolo | G10H 1/342 463/7 |
| 2007/0234881 A1 | 10/2007 | Takehisa | |
| 2007/0234885 A1 * | 10/2007 | Schmidt | G10H 1/342 84/722 |
| 2007/0243915 A1 | 10/2007 | Egozy et al. | |
| 2007/0245881 A1 | 10/2007 | Egozy et al. | |
| 2008/0009346 A1 | 1/2008 | Jessop et al. | |
| 2008/0076497 A1 | 3/2008 | Kiskis et al. | |
| 2008/0102958 A1 | 5/2008 | Kitamura et al. | |
| 2008/0113698 A1 | 5/2008 | Egozy | |
| 2008/0200224 A1 | 8/2008 | Parks | |
| 2008/0220864 A1 | 9/2008 | Brosius et al. | |
| 2008/0255914 A1 | 10/2008 | Oren et al. | |
| 2008/0268943 A1 | 10/2008 | Jacob | |

(56) References Cited

U.S. PATENT DOCUMENTS

| | | | |
|---|---|---|---|
| 2008/0280680 | A1 | 11/2008 | Dutilly et al. |
| 2008/0311969 | A1 | 12/2008 | Kay et al. |
| 2008/0311970 | A1* | 12/2008 | Kay ................. A63F 13/10 463/7 |
| 2009/0075711 | A1* | 3/2009 | Brosius .............. A63F 13/10 463/7 |
| 2009/0088249 | A1 | 4/2009 | Kay et al. |
| 2009/0104956 | A1 | 4/2009 | Kay et al. |
| 2009/0107320 | A1 | 4/2009 | Willacy et al. |
| 2009/0258686 | A1 | 10/2009 | McCauley et al. |
| 2010/0009749 | A1 | 1/2010 | Chrzanowski, Jr. et al. |
| 2010/0016079 | A1 | 1/2010 | Jessop |
| 2010/0029386 | A1 | 2/2010 | Pitsch et al. |
| 2010/0041477 | A1 | 2/2010 | Kay et al. |
| 2010/0137049 | A1 | 6/2010 | Epstein |
| 2010/0300264 | A1 | 12/2010 | Foster |
| 2010/0300265 | A1 | 12/2010 | Foster et al. |
| 2010/0300266 | A1 | 12/2010 | Stoddard et al. |
| 2010/0300268 | A1 | 12/2010 | Applewhite et al. |
| 2010/0300269 | A1 | 12/2010 | Applewhite |
| 2010/0300270 | A1 | 12/2010 | Applewhite et al. |
| 2010/0304810 | A1 | 12/2010 | Stoddard |
| 2010/0304811 | A1* | 12/2010 | Schmidt ............. A63F 13/46 463/7 |
| 2010/0304863 | A1 | 12/2010 | Applewhite et al. |
| 2010/0307321 | A1 | 12/2010 | Mann et al. |
| 2010/0319517 | A1 | 12/2010 | Savo et al. |
| 2011/0028214 | A1 | 2/2011 | Bright et al. |
| 2011/0086705 | A1* | 4/2011 | Chiu ................. A63F 13/44 463/35 |
| 2011/0251840 | A1 | 10/2011 | Cook et al. |
| 2011/0306397 | A1 | 12/2011 | Fleming et al. |
| 2014/0020546 | A1* | 1/2014 | Sumi ............... G10H 1/0008 84/609 |
| 2014/0318347 | A1* | 10/2014 | Wang .............. G10H 1/0008 84/609 |
| 2015/0127669 | A1* | 5/2015 | Roy ............... G10H 1/361 707/755 |
| 2015/0161978 | A1 | 6/2015 | Packouz |
| 2016/0240179 | A1 | 8/2016 | Uemura et al. |
| 2016/0343362 | A1* | 11/2016 | Brosius ........... G10H 1/0016 |
| 2017/0025107 | A1 | 1/2017 | Packouz |
| 2017/0025108 | A1 | 1/2017 | Packouz |
| 2017/0092252 | A1* | 3/2017 | Lopiccolo ............ G10H 1/361 |
| 2017/0092254 | A1* | 3/2017 | Lopiccolo ............ G10H 1/42 |

FOREIGN PATENT DOCUMENTS

| | | | |
|---|---|---|---|
| EP | 1081680 | A1 | 3/2001 |
| EP | 1 096 468 | A2 | 5/2001 |
| EP | 1145749 | A2 | 10/2001 |
| EP | 1 825 896 | A1 | 8/2007 |
| JP | 2000288254 | | 10/2000 |
| JP | 2001075579 | | 3/2001 |
| WO | WO-8601927 | A1 | 3/1986 |
| WO | WO-2004008430 | A1 | 1/2004 |
| WO | WO-2007055522 | A1 | 5/2007 |
| WO | WO 2007115072 | A1 * | 10/2007 ........... A63F 13/06 |
| WO | WO-2007115072 | A1 | 10/2007 |
| WO | WO-2007115299 | A2 | 10/2007 |

OTHER PUBLICATIONS

Association of British Scrabble Players, "Rolling System", ABSP, URL:<http://www.absp.org.uk/results/ratings_detail.shmtl>, accessed May 25, 2011 (4 pages).

Audio Grafitti: "Audio Graffiti: Guide to Drum & Percussion Notation", URL:http://web/mit.edu/merolish/Public/drums.pdf, Aug. 2004 (4 pages).

Dance Dance Revolution Max, Game Manual, Konami Corporation, released in the US on Oct. 29, 2009 (2 pages).

Definition of "Magnitude", Google.com, https://www.google.com/search?q=define%3Amagnitude&sugexp=chome,mod=1&sourceid=chrome..., retrieved Aug. 16, 2012 (2 pages).

European Extended Search Report issued in EP16170347.5, dated Sep. 23, 2016 (8 pages).

GamesRadar Guitar Hero Summary, http://www.web.archive.org/web/20080212013350/http://www.gamesradar.com/ps2/.../g-2005121692014883026, accessed Jul. 8, 2012 (3 pages).

Guitar Hero (video game)—Wikipedia, the free encyclopedia, Release Date Nov. 2005, http://en.wikipedia.org/w/index.php?title=guitary_hero&oldid=137778068, accessed May 22, 2012 (5 pages).

Guitar Hero—Wikipedia, the free encyclopedia—Released Nov. 8, 2005, http://en.wikipedia.org/wiki/Guitar_Hero_(series), accessed Mar. 20, 2009 (25 pages).

Guitar Hero Reviewed by T. Prime, http://www.gamefaqs.com/console/ps2/review/R113400.html, accessed Jan. 1, 2010 (2 pages).

Guitar Hero Review by Misfit119, Retrieved Jan. 2, 2010. http://www.gamefaqs.com/console/ps2/review/R110926.html (1 page).

Guitar Hero Review by Ninjujitsu. Retrieved Jan. 2, 2010. http://www.gamefaqs.com/console/ps2/review/R94093.html (1 page).

Guitar Hero Review by SaxMyster. Retrieved Jan. 2, 2010, http://www.gamefaqs.com/console/ps2/review/R109815.html (1 page).

GuitarFreaks—Wikipedia, the free encyclopedia—(Publisher—Konami, Konami Digital Entertainment) Release Date 1998, http://en/wikipedia.org/wiki/GuitarFreaks, http://en.wikipedia.org/wiki/List_of_GuitarFreaks_and_Drummania_Games, accessed Mar. 19, 2009 (5 pages).

Index of /Partitions, entersandman.com, http://web.archive.org/web/20061021231758/http://batterieandcosite.free.fr/Partitions, pp. 1, 22, and 36, accessed Oct. 2, 2008 (3 pages).

Lohman, T., "Rockstar vs Guitar Hero", UNLV: The Rebel Yell—Nov. 13, 2008, http://unlvrebelyell.com/2008/11/13/rockstar-vs-guitar-hero/, accessed Mar. 19, 2009 (5 pages).

Nakano, T., et al., "Voice Drummer: A Music Notation Interface of Drum Sounds Using Voice Percussion Input", UIST '05—Adjunct Proceedings of the 18th Annual ACM Symposium on User Interface Software and Technology, Oct. 23-27, 2005, Seattle, WA, USA (2 pages).

ncsx.com: Game Synopsys of Guitar Freaks & DrumMania Masterpiece Gold, with a date of Mar. 8, 2007, and with an Archive.org Wayback Machine verified date of May 17, 2007, downloaded from http://web.archive.org/web/20070517210234/http://www.ncsx.com/2007/030507/guitarfreaks_gold.htm, National Console Support, Inc., accessed Jun. 7, 2011 (4 pages).

Ramsey, Aaron, "GuitarFreaks & DrumMania Masterpiece Gold FAQ v1.04", with a revision date of Apr. 2, 2007, and with an Archive.org Wayback Machine verified date of Apr. 22, 2007, downloaded from http://web/archive.org/web/20070422184212/http://www.gamefaqs.com/console/ps2/file/9..., accessed Jun. 10, 2011 (52 pages).

RedOctane. "Guitar Hero II Manual", game manual, Activision Publishing, Inc., 2006 (13 pages).

Rock Band (video game), Wikipedia, the free encyclopedia, http://en.wikipedia.org/wiki/Rock_Band_(video_game), accessed Jul. 26, 2011 (29 pages).

Rock Band Wii Instructional Booklet, Harmonix Music Systems, Inc., 2008 (15 pages).

Sheet Music: "Enter Sandman", by Metallica, URL:http://batterieandcosite.free.fr/Partitions/entersandman.pdf (4 pages).

Taiko Drum Master Instruction Manual, NAMCO, 2004 (18 pages).

Virginia Tech Multimedia Music Dictionary: "P: Phrase", Virginia Tech University URL:<http://www.music.vt.edu/musicdictionary/textp/Phrase.html>, accessed May 25, 2011 (7 pages).

* cited by examiner

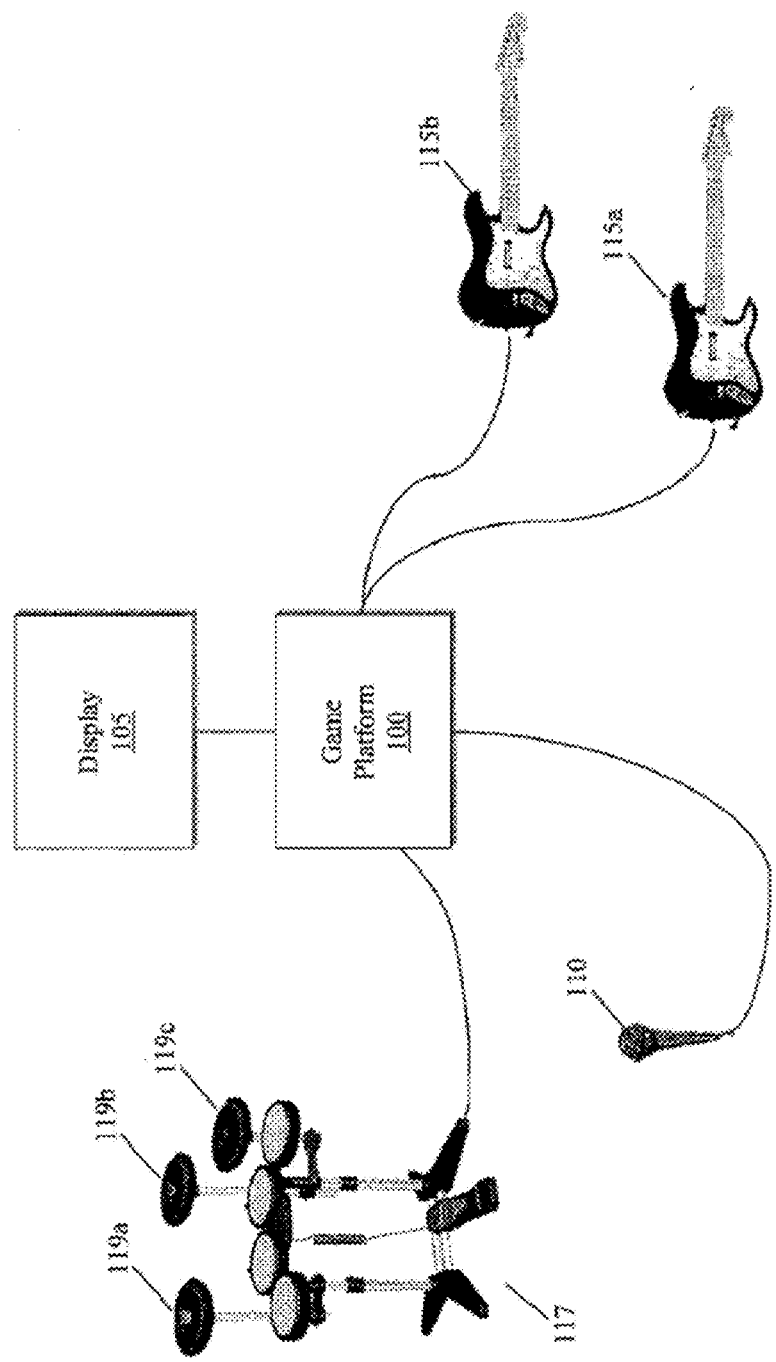

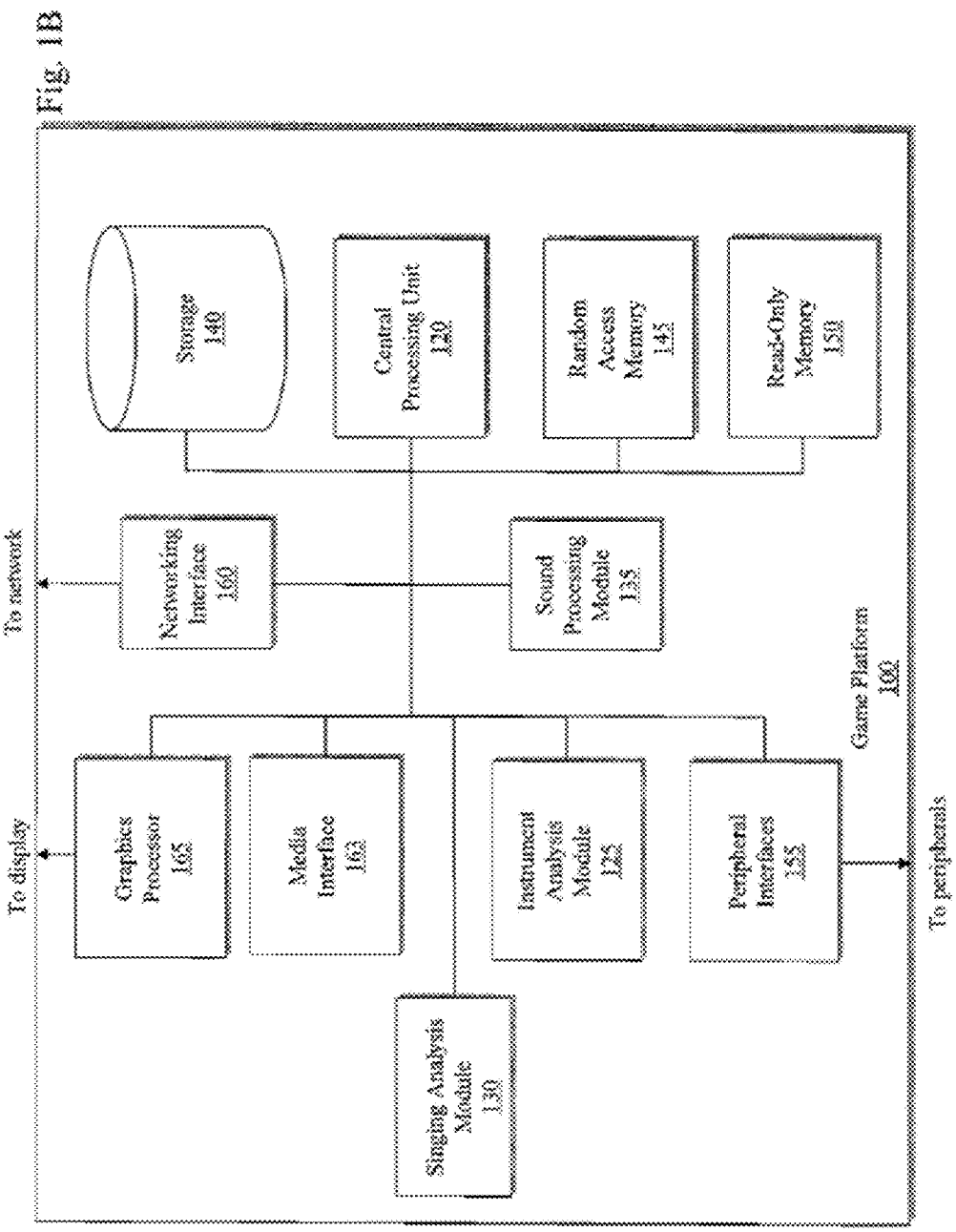

| Right hand strum | Left hand frets | Tilted? | Output |
|---|---|---|---|
| Slow down strum | 0 to 1 fret | no | single note |
| Slow up strum | 0 to 1 fret | no | bent single note |
| Slow down strum | 2 to 4 frets | no | double-, triple- or quadruple-stop notes |
| Slow up strum | 2 to 4 frets | no | bent double-, triple- or quadruple-stop notes |
| 8th note strumming | 0 to 1 fret | no | 8th note tremolo OR random 8th note lick |
| 16th note strumming | 0 to 1 fret | no | 16th note tremolo OR random 16th note lick |
| 8th note strumming | 2 to 4 frets | no | specific 8th note lick |
| 16th note strumming | 2 to 4 frets | no | specific 16th note lick |
| very fast strumming (faster than 16th notes) | 0 to 4 frets | no | very fast "gibberish"-style solo, like "Cult of Personality" solo |
| any kind of strumming | all 5 lower or upper frets | n/a | random guitar NOISES (scrapes, squeals, etc) |
| single strum | hold 1 fret, hammer on higher frets | n/a | Eddie Van Halen-style TAPPING |
| no strum | hold any note | yes | guitar FEEDBACK |

Fig. 3A

| Right hand strum | Left hand frets | Output |
|---|---|---|
| Slow up or down strum | 0 to 1 fret | single note |
| Slow up or down strum | 2 adjacent fret buttons (e.g., xx) | single palm muted power chord |
| Slow up or down strum | 2 fret buttons with a single space between them (e.g., x0x) | single power chord |
| Slow up or down strum | 3 adjacent fret buttons (e.g., xxx) | Single barre chord |
| 8th note strumming | 2 adjacent fret buttons (e.g., xx) | 8th note stream of palm muted power chords |
| 8th note strumming | 2 fret buttons with a single space between them (e.g., x0x) | 8th note stream of power chords |
| 8th note strumming | 3 adjacent fret buttons (e.g., xxx) | 8th note stream of barre chords |
| 8th note strumming | 1/2/4 or 1/3/4 fret buttons (e.g., xx0x or x0xx) | 8th note arpeggio |
| 16th note strumming | 2 adjacent fret buttons (e.g., xx) | 16th note stream of palm muted power chords |
| 16th note strumming | 2 fret buttons with a space between them (e.g., x0x) | 16th note stream of power chords |
| 16th note strumming | 3 adjacent fret buttons (e.g., xxx) | 16th note stream of barre chords |
| 16th note strumming | 1/2/4/ or 1/3/4 fret buttons (e.g., xx0x or x0xx) | 16th note stream of top strings doublestop |

Fig. 3B

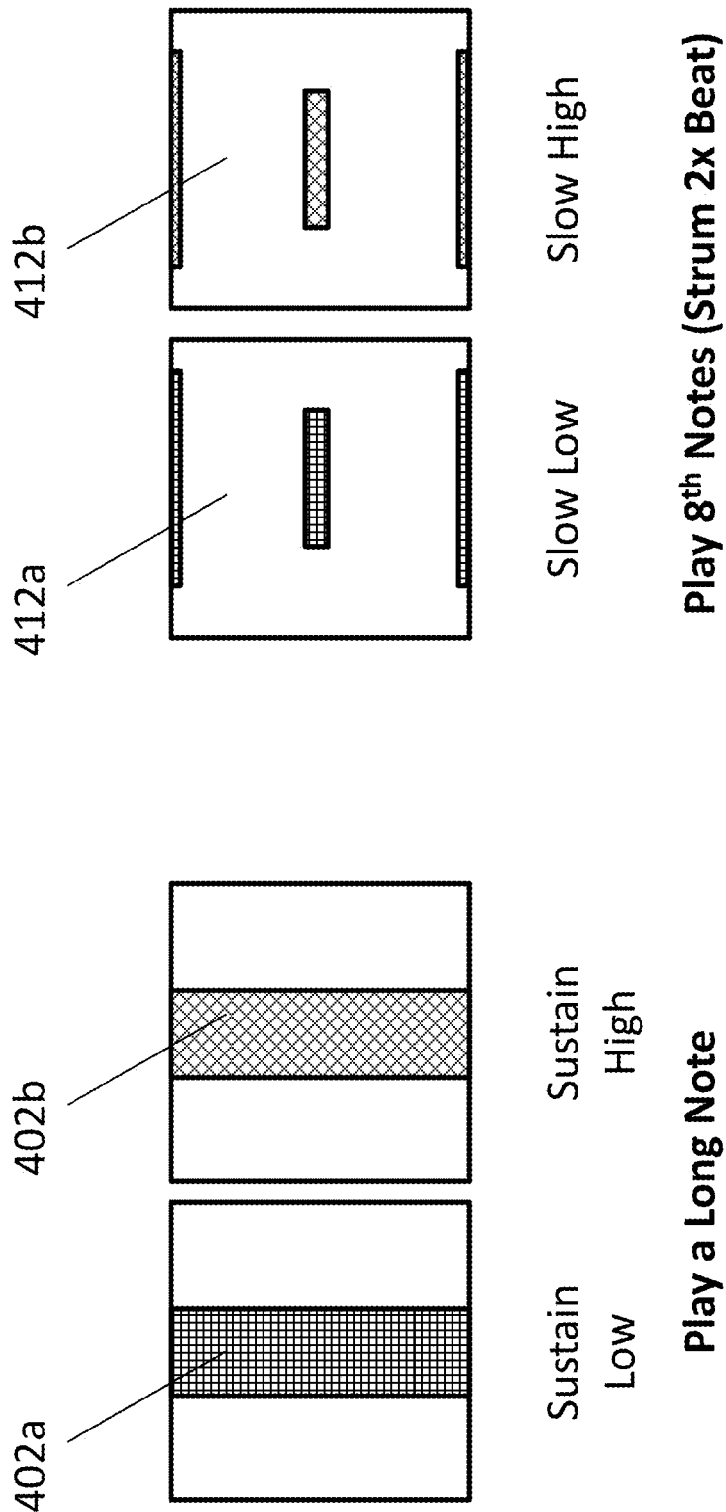

Finger Tapping

Scrapes, squeals, etc.

Play 16th Notes (Strum 4x Beat)

Play Whatever You Want

Hold a Note and Tilt

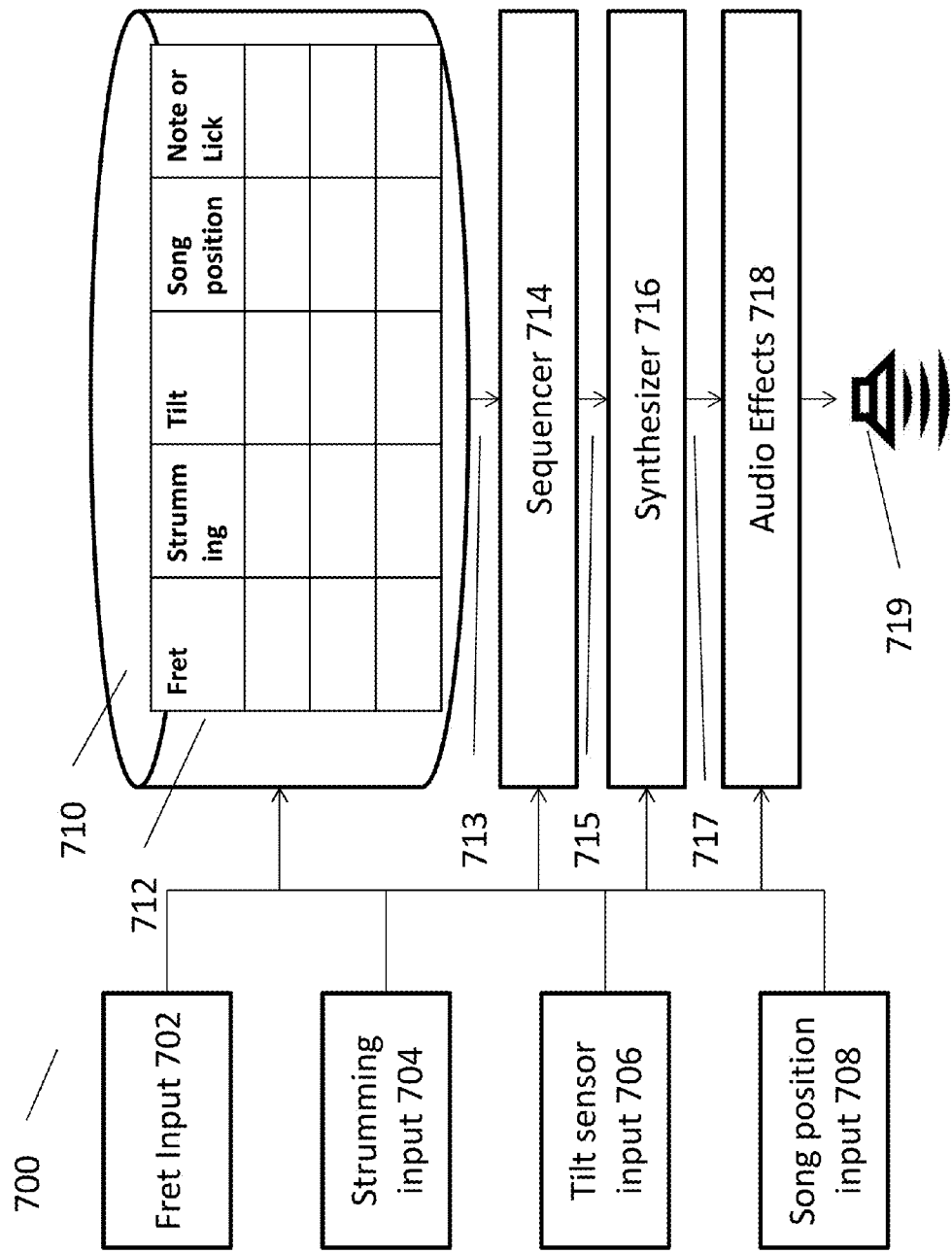

IMPROVISED GUITAR SIMULATION

RELATED APPLICATIONS

This application claims benefit under 35 U.S.C. §119(e) of U.S. Provisional Patent Application No. 62/163,503, filed May 19, 2015, entitled "Improvised Guitar Solo Simulation," the content of which is incorporated by reference in its entirety.

FIELD OF THE INVENTION

The present invention relates to video games, and, more specifically, rhythm-action games which simulate the experience of playing musical instruments.

BACKGROUND OF THE INVENTION

Music making is often a collaborative effort among many musicians who interact with each other. One form of musical interaction may be provided by a video game genre known as "rhythm-action," which involves a player performing phrases from an assigned, prerecorded musical composition using a video game's input device to simulate a musical performance. If the player performs a sufficient percentage of the notes or cues displayed for the assigned part, the player may score well for that part and win the game. If the player fails to perform a sufficient percentage, the player may score poorly and lose the game. Two or more players may compete against each other, such as by each one attempting to play back different, parallel musical phrases from the same song simultaneously, by playing alternating musical phrases from a song, or by playing similar phrases simultaneously. The player who plays the highest percentage of notes correctly may achieve the highest score and win.

Two or more players may also play with each other cooperatively. In this mode, players may work together to play a song, such as by playing different parts of a song, either on similar or dissimilar instruments. One example of a rhythm-action game with different instruments is the ROCK BAND® series of games, developed by Harmonix Music Systems, Inc. ROCK BAND® simulates a band experience by allowing players to play a rhythm-action game using various simulated instruments, e.g., a simulated guitar, a simulated bass guitar, a simulated drum set, or by singing into a microphone.

Past rhythm-action games that have been released for home consoles have utilized a variety of controller types. For example, GUITAR HERO II, published by Red Octane, could be played with a simulated guitar controller or with a standard game console controller.

SUMMARY

Embodiments of the present disclosure are directed at improvised guitar simulation.

According example 1, the present disclosure is directed at a method for evaluating with at least one processor a player's musical improvisation in a rhythm-action game, the method comprising: receiving, from a controller in communication with at least one processor, at least one note input and at least one rhythm input; determining, by the at least one processor, an improvised musical passage based on the at least one note input and the at least one timing input, the improvised musical passage having at least one note and at least one rhythm; evaluating, by the at least one processor, the improvised musical passage to determine whether a set of target notes includes the at least one note of the improvised musical passage, and whether a set of target rhythms includes the at least one rhythm of the improvised musical passage; and changing, by the at least one processor, an aspect of gameplay based on the evaluation.

According to example 2, the present disclosure is directed at the method of example 1, wherein the set of target notes and the set of target rhythms are associated with a cue, and the method further comprises transmitting, by the at least one processor, display data comprising the cue to a display.

According to example 3, the present disclosure is directed at the method of any of examples 1-2, wherein changing the aspect of gameplay includes changing a score of the player based on the evaluation.

According to example 4, the present disclosure is directed at the method of any of examples 1-3, wherein the controller is a simulated guitar controller.

According to example 5, the present disclosure is directed at the method of any of examples 1-4, wherein the simulated guitar controller has a plurality of fret buttons, and wherein the at least one note input corresponds to an activation of at least one fret button of the plurality of fret buttons.

According to example 6, the present disclosure is directed at the method of any of examples 1-5, wherein the simulated guitar controller has a strum bar, and wherein the at least one rhythm input corresponds to at least one activation of the strum bar.

According to example 7, the present disclosure is directed at the method of any of examples 1-6, wherein the determining of the improvised musical passage is based on a tempo at which the strum bar is activated.

According to example 8, the present disclosure is directed at the method of any of examples 1-7, wherein the determining of the improvised musical passage comprises selecting a real time rhythm when the tempo is below a speed threshold, and selecting a quantized rhythm when the tempo is above the speed threshold.

According to example 9, the present disclosure is directed at the method of any of examples 1-8, wherein the simulated guitar controller has a tilt sensor configured to sense a tilt of the simulated guitar controller; and the determining of the improvised musical passage is based at least in part on the sensed tilt of the simulated guitar controller.

According to example 10, the present disclosure is directed at the method of any of examples 1-9, wherein: the set of target notes comprises a first subset of target notes and a second subset of target notes; the set of target rhythms comprises a first subset of target rhythms and a second subset of target rhythms; and the method further comprises: changing, by the at least one processor, the aspect of gameplay in a first way when the first subset of target notes includes the at least one note of the improvised musical passage, and the first subset of target rhythms includes the at least one rhythm of the improvised musical passage; and changing, by the at least one processor, the aspect of gameplay in a second way when the second subset of target notes includes the at least one note of the improvised musical passage, and the second subset of target rhythms includes the at least one rhythm of the improvised musical passage.

According to example 11, the present disclosure is directed at the method of any of examples 1-10, wherein: the first subset of target notes and the first subset of target rhythms are associated with a first cue; the second subset of target notes and the second subset of target rhythms are associated with a second cue; and the method further comprises transmitting, by the at least one processor, display data comprising the first cue and the second cue to a display.

According to example 12, the present disclosure is directed at non-transitory computer readable media for enabling at least one processor to evaluate a player's musical improvisation in a rhythm-action game, the media storing machine-readable instructions that are configured to, when executed by the at least one processor, cause the at least one processor to: receive, from a controller, at least one note input and at least one rhythm input; determine an improvised musical passage based on the at least one note input and the at least one timing input, the improvised musical passage having at least one note and at least one rhythm; evaluate the improvised musical passage to determine whether a set of target notes includes the at least one note of the improvised musical passage, and whether a set of target rhythms includes the at least one rhythm of the improvised musical passage; and change an aspect of gameplay based on the evaluation.

According to example 13, the present disclosure is directed at the method and/or non-transitory computer readable media of any of examples 1-12, wherein the set of target notes and the set of target rhythms are associated with a cue, and the instructions are further configured to cause the at least one processor to transmit display data comprising the cue to a display.

According to example 14, the present disclosure is directed at the method and/or non-transitory computer readable media of any of examples 1-13, wherein the instructions are configured to cause the at least one processor to change the aspect of gameplay by changing a score of the player based on the evaluation.

According to example 15, the present disclosure is directed at the method and/or non-transitory computer readable media of any of examples 1-14, wherein the controller is a simulated guitar controller.

According to example 16, the present disclosure is directed at the method and/or non-transitory computer readable media of any of examples 1-15, wherein the simulated guitar controller has a plurality of fret buttons, and wherein the at least one note input corresponds to an activation of at least one fret button of the plurality of fret buttons.

According to example 17, the present disclosure is directed at the method and/or non-transitory computer readable media of any of examples 1-16, wherein the simulated guitar controller has a strum bar, and wherein the at least one rhythm input corresponds to at least one activation of the strum bar.

According to example 18, the present disclosure is directed at the method and/or non-transitory computer readable media of any of examples 1-17, wherein the instructions are configured to cause the at least one processor to determine the improvised musical passage based on a tempo at which the strum bar is activated.

According to example 19, the present disclosure is directed at the method and/or non-transitory computer readable media of any of examples 1-18, wherein the instructions are configured to cause the at least one processor to determine the improvised musical passage by selecting a real time rhythm when the tempo is below a speed threshold, and by selecting a quantized rhythm when the tempo is above the speed threshold.

According to example 20, the present disclosure is directed at the method and/or non-transitory computer readable media of any of examples 1-19, wherein the simulated guitar controller has a tilt sensor configured to sense a tilt of the simulated guitar controller; and the instructions are configured to cause the at least one processor to determine the improvised musical passage based at least in part on the sensed tilt of the simulated guitar controller.

According to example 21, the present disclosure is directed at the method and/or non-transitory computer readable media of any of examples 1-20, wherein: the set of target notes comprises a first subset of target notes and a second subset of target notes; the set of target rhythms comprises a first subset of target rhythms and a second subset of target rhythms; and the instructions are further configured to cause the at least one processor to: change the aspect of gameplay in a first way when the first subset of target notes includes the at least one note of the improvised musical passage, and the first subset of target rhythms includes the at least one rhythm of the improvised musical passage; and change the aspect of gameplay in a second way when the second subset of target notes includes the at least one note of the improvised musical passage, and the second subset of target rhythms includes the at least one rhythm of the improvised musical passage.

According to example 22, the present disclosure is directed at the method and/or non-transitory computer readable media of any of examples 1-21, wherein: the first subset of target notes and the first subset of target rhythms are associated with a first cue; the second subset of target notes and the second subset of target rhythms are associated with a second cue; and the instructions are further configured to cause the at least one processor to transmit display data comprising the first cue and the second cue to a display.

According to example 23, the present disclosure is directed at a computer system for evaluating a player's musical improvisation in a rhythm-action game, the computer system comprising at least one processor configured to: receive, from a controller, at least one note input and at least one rhythm input; determine an improvised musical passage based on the at least one note input and the at least one timing input, the improvised musical passage having at least one note and at least one rhythm; evaluate the improvised musical passage to determine whether a set of target notes includes the at least one note of the improvised musical passage, and whether a set of target rhythms includes the at least one rhythm of the improvised musical passage; and change an aspect of gameplay based on the evaluation.

According to example 24, the present disclosure is directed at the method, non-transitory computer readable media, and/or computer system of any of examples 1-23, wherein the set of target notes and the set of target rhythms are associated with a cue, and the at least one processor is further configured to transmit display data comprising the cue to a display.

According to example 25, the present disclosure is directed at the method, non-transitory computer readable media, and/or computer system of any of examples 1-24, wherein the at least one processor is configured to change the aspect of gameplay by changing a score of the player based on the evaluation.

According to example 26, the present disclosure is directed at the method, non-transitory computer readable media, and/or computer system of any of examples 1-25, wherein the controller is a simulated guitar controller.

According to example 27, the present disclosure is directed at the method, non-transitory computer readable media, and/or computer system of any of examples 1-26, wherein the simulated guitar controller has a plurality of fret buttons, and wherein the at least one note input corresponds to an activation of at least one fret button of the plurality of fret buttons.

According to example 28, the present disclosure is directed at the method, non-transitory computer readable media, and/or computer system of any of examples 1-27, wherein the simulated guitar controller has a strum bar, and wherein the at least one rhythm input corresponds to at least one activation of the strum bar.

According to example 29, the present disclosure is directed at the method, non-transitory computer readable media, and/or computer system of any of examples 1-28, wherein the at least one processor is configured to determine the improvised musical passage based on a tempo at which the strum bar is activated.

According to example 30, the present disclosure is directed at the method, non-transitory computer readable media, and/or computer system of any of examples 1-29, wherein the at least one processor is configured to determine the improvised musical passage by selecting a real time rhythm when the tempo is below a speed threshold, and by selecting a quantized rhythm when the tempo is above the speed threshold.

According to example 31, the present disclosure is directed at the method, non-transitory computer readable media, and/or computer system of any of examples 1-30, wherein the simulated guitar controller has a tilt sensor configured to sense a tilt of the simulated guitar controller; and the at least one processor is configured to determine the improvised musical passage based at least in part on the sensed tilt of the simulated guitar controller.

According to example 32, the present disclosure is directed at the method, non-transitory computer readable media, and/or computer system of any of examples 1-31, wherein: the set of target notes comprise a first subset of target notes and a second subset of target notes; the set of target rhythms comprise a first subset of target rhythms and a second subset of target rhythms; and the at least one processor is configured to: change the aspect of gameplay in a first way when the first subset of target notes includes the at least one note of the improvised musical passage, and the first subset of target rhythms includes the at least one rhythm of the improvised musical passage; and change the aspect of gameplay in a second way when the second subset of target notes includes the at least one note of the improvised musical passage, and the second subset of target rhythms includes the at least one rhythm of the improvised musical passage.

According to example 33, the present disclosure is directed at the method, non-transitory computer readable media, and/or computer system of any of examples 1-32, wherein: the first subset of target notes and the first subset of target rhythms are associated with a first cue; the second subset of target notes and the second subset of target rhythms are associated with a second cue; and the at least one processor is configured to transmit display data comprising the first cue and the second cue to a display.

BRIEF DESCRIPTION OF THE DRAWINGS

The foregoing and other objects, features, and advantages of the inventions herein, as well as the inventions themselves, will be more fully understood from the following description of various embodiments, when read together with the accompanying drawings, in which:

FIG. 1A is a diagram depicting a game platform and various components in signal and/or electrical communication with the game platform;

FIG. 1B is a diagram depicting various components and modules of a game platform;

FIG. 3A is an exemplary table showing how a player's input on a guitar controller translates to audio output;

FIG. 3B is another exemplary table showing how a player's input on a guitar controller translates to audio output;

FIGS. 4A, 4B, 4C, 4D, 4E, and 4F illustrate exemplary cues that can be displayed by a rhythm-action game to prompt players to improvise within certain guidelines;

FIG. 7 depicts an exemplary system for implementing an improvised guitar playing feature in a rhythm-action game.

DETAILED DESCRIPTION

Figure 2:
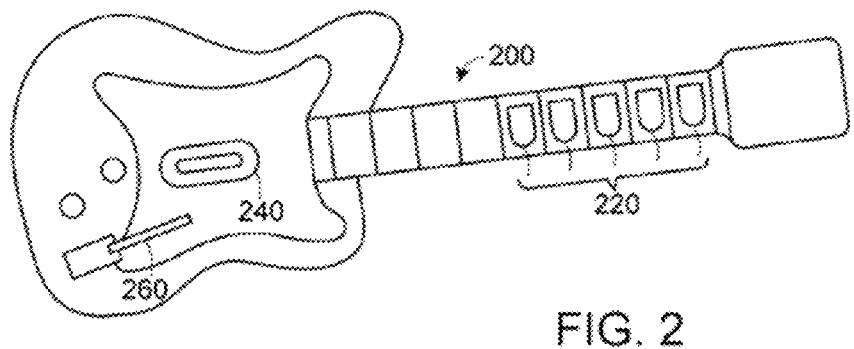
FIG. 2 is a configuration diagram of one embodiment of a guitar controller.

Embodiments of the disclosed subject matter can provide techniques for implementing an improvised guitar playing feature that allows players of rhythm-action games to play improvised guitar passages using a guitar controller. One of the objects of this improvised guitar playing feature is to provide a fun, unique and expressive new feature for rhythm-action games. For example, a rhythm-action game can be configured to produce a pleasing, musical-sounding passage even if operated in an inexpert fashion by novice players. As described in further detail below, one of the ways this can be done is by stringing together $8^{th}$ and $16^{th}$ note musical phrases, or "licks," to form authentic, melodic and rhythmically musical and impressive guitar lines, regardless of player ability. The term "lick" can be used to refer to any short bit of musical material, such as a set of notes, arpeggios, or one or more chords. In some embodiments, generally an $8^{th}$ note lick will predominantly contain $8^{th}$ notes, but does not have to do so strictly. Similarly, in some embodiments, generally a $16^{th}$ note lick will predominantly contain $16^{th}$ notes, but may contain notes of other rhythmic values as well. The improvised guitar playing feature can also cause a rhythm-action game to output notes that are musically compatible with the current key and chord of the song. Furthermore, the improvised guitar playing feature can use digital signal processing to add audio effects to produce convincing guitar tones.

Another object of the disclosed improvised guitar playing feature is to offer players enough control to produce purposeful and varied output. For example, a rhythm-action game can be configured to allow players to play single short notes, long notes and bends, hammer-ons, pull-offs, double-stops, random and deterministic $8^{th}$ and $16^{th}$ note licks, fast tremolos and finger-tapping, histrionic guitar noises, feedback, palm muted or unmuted power chords, major chords, minor chords, dominant chords, diminished chords, arpeggios, and whammy bar pitch bends. Players can also be given control over the overall range (low vs. high) of the notes and licks by using lower vs. upper frets on the guitar controller. Players can also have some degree of control over the sound/tone of the produced improvised musical passage by exercising control over the guitar/pickup choice, amplifier choice, and possible guitar audio effects (e.g., distortion, reverb, delay, chorus, wah, etc.).

Another object of the disclosed improvised guitar playing feature is to give players of the rhythm-action game a meaningful gameplay experience by providing a means of scoring the players' performance, e.g., by assigning a higher score if the players performed skillfully and/or followed cues provided by the rhythm-action game closely.

Yet another object of the disclosed improvised guitar playing feature is to implement a rhythm-action game that is easily learnable, yet deep and complex enough to allow improvement with practice. This can be achieved by giving players a variety of input actions and cues to follow. Some of these input actions and cues, such as playing and sustaining single notes, can be reasonably intuitive and discoverable because they behave the way players might naturally expect. Other input actions and cues, such as $8^{th}$ and $16^{th}$ note runs, while intuitive, may require some practice to do well. Other input actions and cues, such as feedback, guitar noise and tapping, can be less intuitive and may require more guidance and practice. Advanced players can master stringing together multiple input actions and cues musically to create expressive and/or high-scoring passages.

FIG. 1A is a diagram depicting a game platform 100 for running game software and various components in signal communication with the game platform. Each player may use a game platform 100 in order to participate in the game. In one embodiment, the game platform 100 is a dedicated game console, such as: PLAYSTATION® 3, PLAYSTATION® 4, or PLAYSTATION®VITA manufactured by Sony Computer Entertainment, Inc.; WII™, WII U™, NINTENDO 2DS™, or NINTENDO 3DS™ manufactured by Nintendo Co., Ltd.; or XBOX®, XBOX 360®, or XBOX ONE® manufactured by Microsoft Corp. In other embodiments, the game platform 100 comprises a personal computer, personal digital assistant, or cellular telephone. Throughout the specification and claims, where reference is made to "the game platform 100" performing a function, "game platform 100" may, for some implementations, be read as "game platform 100 with game software executing on it." References to the game platform 100 and omission of reference to the game software does not imply absence of the game software. Game software alone may also embody the invention, e.g., a computer program product, tangibly embodied in a computer-readable storage medium, while in some embodiments the invention is implemented purely in hardware such as a computer processor configured to perform specific functions. In other embodiments the invention is embodied by a combination of hardware and software.

The game platform 100 is typically in electrical and/or signal communication with a display 105. This may be a television, an LCD monitor, projector, or the like. The game platform is also typically in electrical or signal communication with one or more controllers or input devices. In FIG. 1A, the game platform 100 is in signal communication with one or more microphones 110, a first simulated guitar controller 115a, a second simulated guitar controller 115b (guitar controllers, collectively, 115), and one or more drum peripherals 117. In the example shown in FIG. 1A, the drum peripheral 117 has the optional cymbals 119a, 119b, and 119c attached. Other inputs can be other simulated instruments such as keyboards (not shown), standard controllers for the respective game platforms, and/or keyboards and/or mice (also not shown). Microphones, controllers, etc. may be connected via a physical wire, e.g., via a USB connection, or may be connected wirelessly, e.g., via Bluetooth, FM, a proprietary wireless protocol used by the Microsoft Xbox One game console, or other wireless signaling protocols.

Though reference is made to the game platform 100 generally, the game platform, in some embodiments such as that depicted in FIG. 1B, contains hardware and/or software that perform general or specific tasks, such as a central processing unit 120, an instrument analysis module 125, a singing analysis module 130, a sound processing module 135 that provides sound output, e.g., to a speaker, a storage device 140, Random Access Memory 145, Read Only Memory 150, peripheral interfaces 155, networking interface 160, media interfaces 163 (e.g., a CD-ROM, DVD, or Blu-Ray drive or SD, Compact Flash, or other memory format interfaces), graphic processors 165 and others. Each module may also contain sub-modules. For example the instrument analysis module 125 may contain a data extractor module, a digital signal processor module, a comparison module, and a performance evaluation module (not shown). Alternatively, in software implementations of the modules, modules or combinations of modules may reside within the RAM 145 or ROM 150 (and/or be loaded into these from media via the media interface 163 or from storage 160) for execution by the central processing unit 120.

In some embodiments, execution of game software limits the game platform 100 to a particular purpose, e.g., playing the particular game. In these scenarios, the game platform 100 combined with the software, in effect, becomes a particular machine while the software is executing. In some embodiments, though other tasks may be performed while the software is running, execution of the software still limits the game platform 100 and may negatively impact performance of the other tasks. While the game software is executing, the game platform directs output related to the execution of the game software to the display 105, thereby controlling the operation of the display. The game platform 100 also can receive inputs provided by one or more players, perform operations and calculations on those inputs, and direct the display to depict a representation of the inputs received and other data such as results from the operations and calculations, thereby transforming the input received from the players into a visual representation of the input and/or the visual representation of an effect caused by the player.

In some embodiments, the processor 120 reads song data from a MIDI-like file. MIDI tracks in the file dictate information for specific instruments or game objects, such as cameras or scene information. The MIDI "notes" in the tracks are indicators for song data, gem placement information, avatar action cues, camera cuts, cues for events on stage, and other game events. Although the MIDI file uses MIDI note numbers, these MIDI notes do not typically correspond to actual note or pitch information. One of skill can appreciate that other file formats can be used by the processor to read data and/or notes. These file formats can include, but are not limited to, text files, binary files, XML files, JSON files, a custom file format, and/or the like.

Referring now to FIG. 2, an embodiment of a simulated guitar controller 200 for use with a video game is shown. The simulated guitar controller 200 is provided with fret buttons 220. Although five fret buttons are shown in FIG. 2, any number of fret buttons 220 may be provided by the controller 200. The simulated guitar controller also includes a "strum bar" 240. In order to successfully "play" a game event, the player holds down one or more of the fret buttons 220 while simultaneously strumming the strum bar 240, in much the same way that one would play a guitar. In some embodiments players may also execute "hammer ons" and "pull offs," as described below, which allows a player to "play" a game event by pressing or releasing only a fret button 220.

Figure 2A:
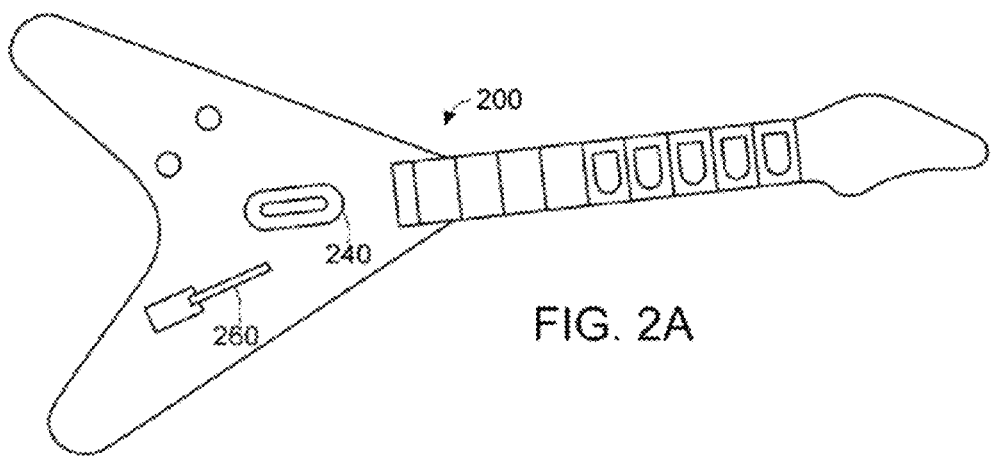
FIG. 2A is a configuration diagram of another embodiment of a guitar controller.
Figure 2B:
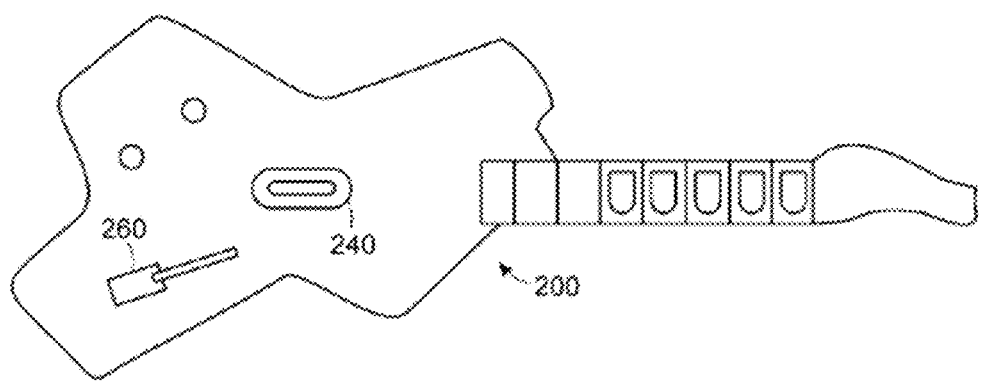
FIG. 2B is a configuration diagram of another embodiment of a guitar controller.

FIGS. 2A and 2B depict alternate embodiments of the guitar controller of FIG. 2. FIG. 2A depicts an embodiment of the guitar controller intended to simulate a guitar model by Gibson known as the "Flying V." FIG. 2B depicts an embodiment of the guitar controller intended to simulate a guitar model known as the "Moderne." Any other body styling may be provided. For example, in some embodiment, the body portion of the guitar controller simulates a Gibson Blueshawk, Gibson Byrdland, Gibson Chet Atkins SST, Gibson Citation, Gibson Corvus, Gibson Digital, Gibson ES-120, Gibson ES-125, Gibson ES-135, Gibson ES-137, Gibson ES-150, Gibson ES-165, Gibson ES-175, Gibson ES-225, Gibson ES-295, Gibson ES-330, Gibson ES-335, Gibson ES-335 "Lucille", Gibson ES-345, Gibson ES-347, Gibson ES-355, Gibson EDS-1275, Gibson Explorer (also known as the X-plorer), Gibson Firebird, Gibson Futura, Gibson Howard Roberts Fusion, Gibson Invader, Gibson L4-CES, Gibson L5, Gibson L5S, Gibson L6-S, Gibson Les Paul, Gibson Les Paul Black Beauty, Gibson Les Paul Custom Anniversary 25/50, Gibson Les Paul Junior, Gibson Les Paul Studio, Gibson Les Paul Swamp Ash Studio, Gibson Les Paul Recording, Gibson Les Paul 23, Gibson Les Paul 432, Gibson (Les Paul) "The Paul" Deluxe (which has a cutaway SG body), Gibson (Les Paul) "The Paul" Deluxe Firebrand (which is characterized in having a cutaway SG body with fire branded Gibson logo), Gibson Marauder, Gibson Melody Maker, Gibson Nighthawk, Gibson RD, Gibson S-1, Gibson SG, Gibson SG Special, Gibson SG Supreme, Gibson Sonex, Gibson Super 400, Gibson Mill, Gibson Advanced Jumbo, Gibson Blues King, Gibson B12-45 12 string, Gibson C-165 Maple, Gibson C-165 Rosewood, Gibson Hummingbird, Gibson Hummingbird Custom, Gibson Dove, Gibson Dove Artist Model, Gibson Doves In Flight Custom, Gibson J-160 E VS Std, Gibson J-180, Gibson J-185, Gibson J-185 EC, Gibson J-185 EC Rosewood, Gibson J-185 EC Cutaway, Gibson J-90 Super Fusion, Gibson J-45, Gibson J-45 Deluxe, Gibson J-45 Rosewood, Gibson J-45 Custom Vine, Gibson J-50, Gibson L-00, Gibson L-130, Gibson L-140, Gibson L-150 Custom, Gibson LC-1 Cascade, Gibson LC-2 Sonoma, Gibson J-100, Gibson Nick Lucas Reissue, Gibson Nick Lucas Elite, Gibson J-150 Maple, Gibson J-200, Gibson J-200 EC, Gibson SJ-200 Western Classic, Gibson J-200 Custom Vine, Gibson J-250 Monarch, Gibson J-2000, Gibson Super 200 Cutaway Custom, Gibson SJ-300 Rosewood, Gibson Sheryl Crow Signature Model, Gibson Songwriter Deluxe, Gibson Songwriter Deluxe Cutaway, Gibson Songwriter Deluxe 12 String, Gibson Southern Jumbo, Gibson Traveling Songwriter, Fender Broadcaster, Fender Bullet, Fender Cyclone, Fender Duo-Sonic, Fender Electric XII, Fender Jaguar, Fender Jag-stang, Fender Jazzmaster, Fender Katana, Fender Contemporary Stratocaster Japan, Fender Lead Series, Fender LTD, Fender Musicmaster, Fender Mustang, Fender Prodigy, Fender Performer, Fender Showmaster, Fender Starcaster, Fender Stratocaster, Stratocaster XII, Fat Strat, Fender Telecaster, Fender Telecaster Custom, Fender Telecaster Deluxe, J5 Telecaster, Fender Telecaster Squire, Fender Toronado, Fender Swinger, Fender Bronco, or Fender Custom.

The body portion of the guitar may simulate bass guitars, such as the Gibson EB-0, Gibson EB-1, Gibson EB-2, Gibson EB-3, Gibson EB-6, Gibson RD bass, Gibson Thunderbird, Gibson Ripper, Gibson Grabber, Gibson G3, Gibson Victory Standard bass, Gibson Les Paul bass, Fender Jazz Bass, Fender Jaguar Bass, Fender Mustang Bass, Fender Precision Bass, Fender Performer Bass, Fender Telecaster Bass, Fender VI, Fender Zone Bass, Fender Dimension Bass, Fender Bass V, Fender Bronco Bass, or Fender Bullet Bass.

Figure 2C:
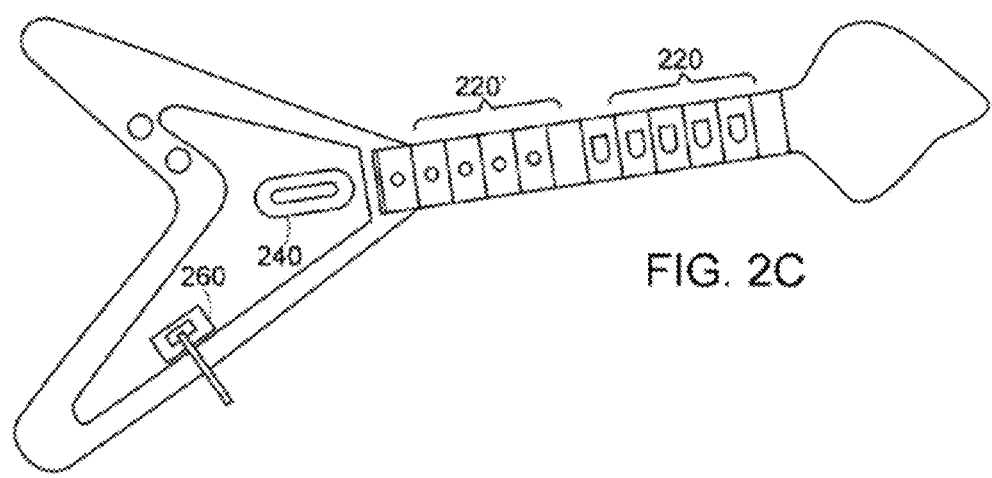
FIG. 2C is a configuration diagram of yet another embodiment of a guitar controller having two sets of fret buttons disposed on the neck of the guitar.

FIG. 2C depicts another alternate embodiment of the guitar controller having two sets of fret buttons 220, 220'. As shown in FIG. 2C a second set of fret buttons 220' is disposed on the "neck" of the guitar proximal to the guitar body, i.e. in between the first set of fret buttons 220 and the guitar body. In some embodiments, the ordering of the second set of fret buttons 220' is the same as the first set of fret buttons 220; that is, if the first set of fret buttons 220 are colored, beginning at the "head" of the guitar neck and moving toward the body, green, red, yellow, blue, orange, then the second set of fret buttons 220' can have the same coloring as one continues down the neck toward the guitar body.

In some embodiments, the fret buttons 220 and 220' may be colored to indicate that the buttons correspond to a particular note, chord, or fret. In some embodiments, a fret button 220 may indicate color by the color of the entire fret button. In other embodiments, only a portion of the fret button may be colored. For example, a fret button may be mostly black, but contain a colored dot or stripe indicating color. Or for example, the fret button may be clear, and one or more lights underneath the fret button may indicate the color.

In other embodiments, other markings on the neck may indicate the "color" of a particular fret button. For example, colored dots may be placed on the neck of the guitar next to one or more fret buttons 220 indicating the color corresponding to the fret button. In another example, patterns of dots may be used to indicate the note, chord, or fret to which a given button corresponds, similar to the patterns of dots used on traditional guitars to designate frets by thirds and octaves. In these embodiments, the fret buttons themselves may be white, clear, black, or all colored a similar color. In still other embodiments, one set of fret buttons 220 may be colored, while a second set of fret buttons is colorless.

In some embodiments, a user of a guitar controller may be able to change the colors corresponding to one or more fret buttons, such as by using stickers, removable button colors, multiple colored LED's under the fret buttons, or otherwise. A game using the guitar controller may then have a configuration tool such that the user can configure the game to recognize the altered colors.

Although shown in FIG. 2C as round buttons, fret buttons 220' may be any shape or size, including the same shape and size of the first set of fret buttons 220.

Referring back to any one of FIGS. 2, 2A, 2B and 2C, the simulated guitar controller 200 also includes a vibrato bar 260, also known to guitar players as a tremolo bar or "whammy bar." The vibrato bar 260, for convenience, will be referred to throughout the remainder of this document as a "whammy bar." The whammy bar 260, as will be described below, may be used to alter the frequency, pitch, volume, sound quality, distortion, simulated feedback sound, or any other attribute of the current note or chord being played by the player.

Figure 2D:
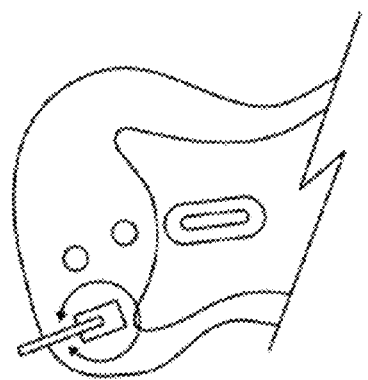
FIG. 2D is a configuration diagram of another embodiment of a guitar controller having a whammy bar in a first position.
Figure 2E:
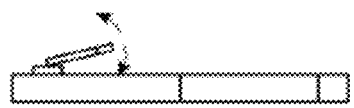
FIG. 2E is a side view diagram of an embodiment of a game controller simulating a guitar that includes a whammy bar.

The whammy bar 260 of the controller resembles a whammy bar of a real guitar. As shown in FIG. 2D, and with comparison to FIG. 2B, the whammy bar 260 can be rotated to any one of a number of positions for the convenience of the player. As shown in FIG. 2D, the whammy bar 260 has been rotated to a position that places it out of the way of the player's strumming hand. In some embodiments, the whammy bar 260 is spring-loaded, like the whammy bar of a real guitar. In these embodiments, as depicted by FIG. 2E, the whammy bar 260 can be pushed down or pulled up to affect the played note. When released, it settles back to its default, neutral position.

The whammy bar is typically manipulated by the guitarist's strumming hand, that is, the hand with which the player operates the strum bar 240. In a real guitar, manipulating the whammy bar directly affects the tension of the guitar strings, and therefore causes the pitch of the vibrating strings to rise and fall as the bar is pulled or pushed. The simulated whammy bar of the guitar controller, the vibrato bar, can be used as a continuous controlling actuator, much like a joystick. Typically, the vibrato bar has a single degree-of-freedom, but it may have more degrees of freedom. It may additionally be used as an on-off switch, instead of a continuous controller. The whammy bar 260 of the controller looks and feels like the whammy bar of a real guitar, and, therefore provides a much more enjoyable gaming experience for the player.

The guitar controller 200 also allows a player to use more sophisticated guitar playing techniques to interact with a game. Two such techniques are "hammer ons" and "pull offs." Hammer-ons and pull-offs allow a guitarist to play notes in rapid succession. Typically, they only require the use of the player's fretting hand. To play a hammer-on note, the guitarist uses one of the free fingers of his fretting hand to strike the guitar string with high velocity. This results in the string vibrating due to the force of the string hitting a fret. As a result, the string need not be strummed by the strumming hand. Pull offs require the guitarist to tug slightly on the string when he releases it from a fret. This pulling action also causes the string to vibrate more, again, eliminating the need to strum the string with the strumming hand.

In the simulated guitar controller 200, hammer-ons may be simulated by allowing the player to press down fret buttons 220 without needing to simultaneously strum the strum bar 240. For a hammer on, a player will generally need to play a "lower" pitched note traditionally, that is, by holding down a fret button and simultaneously activating the strum bar. To play a higher note as a hammer on, the player need only press a "higher" pitched fret button associated with the higher note, without activating the strum bar a second time.

Similarly, in pull-offs, the player can "play a note" by releasing a fret button 220 without needing to simultaneously strum the strum bar 240. For a pull off, a player will generally need to play a pair of notes traditionally, that is, by holding down both fret buttons and simultaneously activating the strum bar. To play the next note using a pull off technique, the player need only release the "higher" pitched fret button to successfully play the note.

Real guitarists often perform flamboyant motions on stage when playing guitar as part of their showmanship. One typical motion involves rotating the guitar vertically so that the neck of the guitar points up, while the body of the guitar is down, usually at waist level. In the simulated guitar controller 200, a mechanical "tilt sensor" can be included that monitors the guitar's physical orientation. This tilt sensor is typically a mercury switch or a ball-bearing switch which acts as a binary actuator, indicating whether the guitar has been rotated into a "neck up" position, or is in the normal playing position. Such tilt sensors have been included in guitar controllers manufactured by Konami and by Red Octane. Other secondary techniques for interacting with the controller include shaking the controller and slapping the controller.

When strumming the guitar controller 200, the player can push the strum bar 240 down to execute a down strum, and pull the strum bar 240 up to execute an up strum. When the improvised guitar playing feature is activated, the rhythm-action game can optionally play a background song designed to accompany whatever improvised musical passage the player executes using the guitar controller 200. While this feature is activated, the speed at which the player strums can affect the sound that is output by the rhythm-action game. For example, a slow strumming speed (below $8^{th}$ note speed) can cause the rhythm-action game to output single note(s) in real time, whether or not those single notes are rhythmically-correct, e.g., whether or not those single notes line up with the rhythmic pulse of the background song. In other embodiments, the slow strumming speed can cause the rhythm-action game to delay outputting the note until the next quantized position (e.g., the next $8^{th}$ note, or the next quarter note). When the player strums at approximately $8^{th}$ note speed, the rhythm-action game can, in some embodiments, output pre-written $8^{th}$ note licks that are "quantized," e.g., licks that are rhythmically correct because they align with the rhythmic pulse of the background song, regardless of the exact timing at which the player strums the strum bar 240. In some embodiments, the strumming speed need not be exactly uniform as long as the average strumming speed over a window of time is at "approximately" the $8^{th}$ note speed of the background song, e.g., the average strumming speed is both (i) faster than an $8^{th}$ note minimum speed threshold that is slightly slower than the $8^{th}$ note speed and also (ii) slower than an $8^{th}$ note maximum speed threshold that is slightly faster than the $8^{th}$ note speed. When the player strums at approximately the $16^{th}$ note speed, the rhythm-action game can output pre-written $16^{th}$ note licks that are also quantized. Again, this strumming speed need not be exactly uniform as long as the average strumming speed over a window of time is at "approximately" the $16^{th}$ note speed of the background song, e.g., the average strumming speed is both (i) faster than a $16^{th}$ note minimum speed threshold that is slightly slower than the $16^{th}$ note speed and also (ii) slower than a $16^{th}$ note maximum speed threshold that is slightly faster than the $16^{th}$ note speed. When the player strums extremely fast (e.g., above the "fast" note maximum speed threshold), the rhythm-action game can, in some embodiments, output a "gibberish"-style guitar passage, e.g., an extremely fast pre-written lick that is musically accurate in terms of pitch, but is output so fast as to have only a vaguely aligned relationship with the tempo of the background song. The guitar solo in "Cult of Personality" by the rock band Living Color is one example of a "gibberish"-style guitar passage. In some embodiments, the $8^{th}$ note maximum speed threshold can be the same as the $16^{th}$ note minimum speed threshold, and the $16^{th}$ note maximum speed threshold can be the same as the "fast" note speed threshold. In other embodiments, the $8^{th}$ note maximum speed threshold can be slower than the $16^{th}$ note minimum speed threshold, and the $16^{th}$ note maximum speed threshold can be slower than the "fast" note speed threshold. The aforementioned $8^{th}$ note minimum speed threshold, $8^{th}$ note maximum speed threshold, $16^{th}$ note minimum speed threshold, $16^{th}$ note maximum speed threshold, and "fast" note speed threshold can be tunable parameters which can be set to different values depending on different factors, such as a difficulty level at which the rhythm-action game is currently set at, the current background song, and/or the identity and/or skill-level of the player.

While the player strums the guitar controller 200's strum bar 240 (e.g., with his right hand), the player can also hold down 0 to 4 frets at a time (e.g., with his left hand). As a real guitar player might expect, releasing a fret after strumming the strum bar 240 stops a note. Holding a fret down after strumming sustains the note until it dies out naturally. Hammer-ons and pull-offs can be executed in the manner described above. In some embodiments, the upper frets 220' can be configured to generally play the same notes/licks as the lower frets 220, but an octave higher. In other embodiments, the upper frets 220' can be configured to play different notes/licks than those assigned to the lower frets 220. Other configurations of the upper frets and lower frets are also possible.

The improvised guitar playing techniques described herein can be incorporated into such rhythm-action games to provide different modes of play. For example, some embodiments of rhythm-action games can incorporate a "normal" play mode and an "improvised" play mode. In a normal play mode for a first portion of the musical composition, the rhythm-action game can disable any guitar improvisation features. Instead, the game can provide cues that direct the player to input specific notes at specific times, and adjust the volume of the musical composition based on whether the player successfully inputs the directed notes at the directed times. In this normal play mode, if the player puts in a correct note at the correct time, the game can play the pre-recorded musical composition at the normal volume. However, if the player puts in an incorrect note, the game can distort or muffle the pre-recorded musical composition, or output a "wrong" note sound. The "wrong" note sound can, in some embodiments, sound off-key or dissonant compared to the pre-recorded musical composition. In the normal play mode, regardless of which incorrect note the player provides, the "wrong" note sound can sound the same. In other words, the rhythm-action game does not actually play what the player inputs. The game only determines whether the player is playing a correct note or an incorrect note. If the player is playing a correct note, the game plays the pre-recorded musical composition. If the player is playing an incorrect note, the game plays a "wrong" note sound, or a distorted version of the pre-recorded musical composition.

The rhythm-action game can then switch to an improvised guitar mode for a second portion of the musical composition, where the system generates custom audio based on the player's frets, strumming, and/or the musical composition to provide audio output that is based on the player's actuation of the input device. In some embodiments, while the player's scoring during the improvised guitar mode is based on how well the player follows displayed prompts, the system can be configured to continue to generate audio based on the player's keyed input (e.g., even if the player is not scoring well while playing in the improvised guitar mode, the game can continue to output audio based on what the player is inputting). Rhythm-action games can switch between normal play and improvised guitar play modes any number of times during a particular musical composition to provide a varied gaming experience to the player.

Alternatively, or in addition, rhythm-action games may incorporate multiple types of improvisation modes. For example, the rhythm action game can provide both a "rhythmic guitar" improvisation mode and a "solo" improvisation mode. A rhythmic guitar improvisation mode can allow the player to improvise using techniques that emphasize rhythm, such as different ways of strumming and different chord structures. Such techniques can be used when accompanying other instruments, or a vocalist. A solo improvisation mode can allow the player to improvise using techniques more suited for guitar solos, where the guitar takes the lead in a song. Such techniques can include, for instance, musically impressive sounding licks, and/or individual notes. Both modes can permit the player to improvise guitar passages, but in different ways. For instance, a certain combination of inputs (e.g., strumming speed, frets pressed, tilt sensor input) can result in different musical output depending on which improvisation mode the rhythm action game is currently in. In some embodiments, rhythm-action games can switch between a normal, non-improvised mode, and multiple improvisation modes (e.g., both rhythmic guitar and solo improvisation modes) throughout a single song, or set of songs. In other embodiments, rhythm-action games can switch only between different types of improvisation modes throughout a song, or set of songs (e.g., have no normal, non-improvised mode), or focus on only one type of improvisation mode.

Different modes may also provide different types of cues to players, and evaluate players' performance relative to these cues in different ways. Cues are described in further detail below in relation to FIGS. 4A-F and 5A-D. Generally, however, a first mode may employ a first set of cues, whereas a second mode may employ a second set of cues. The first and the second set of cues may include some cues in common, but may also include some cues that are not shared between the two sets. In some embodiments, the first and the second set of cues may be entirely distinct. At least some of the second set of cues can direct the player to do different types of actions than the first set of cues. The second set of cues may also differ in appearance from the first set of cues.

Cues may also be presented in a different way. For example, in a first mode, such as the solo mode, cues may appear sequentially, one at a time, and direct the player to provide different types of input sequentially. This can cause the player to execute different types of improvisation techniques. In this first mode, the player's performance can be evaluated based on how closely the player adheres to the cues as they appear one at a time. This is described in further detail below in relation to FIG. 6. In another mode, such as a rhythm-guitar mode, cues may appear all at once. Similar to the solo mode, the cues in the rhythm-guitar mode may each correspond to a particular improvisation technique. Instead of appearing sequentially in time, however, the player may be instructed to perform the cues in any order in time. Each time the player performs a type of improvisation technique, the cue associated with that technique may change in appearance (e.g., disappear, appear, fade in or out, change in brightness, change in color, be crossed out or underlined, etc.) to indicate that the player has successfully performed that technique. The player may then be evaluated based on how many different techniques he or she performs within a certain amount of time, regardless of the order in which the player executes those techniques. In yet other embodiments, some modes may not employ cues at all, and may allow the player to improvise freely. Each time the player successfully executes an improvisation technique, or executes an improvisation technique that the player has not yet performed, the rhythm-action game can alter some aspect of gameplay to recognize this execution. Aspects of gameplay that can be altered include, but are not limited to, the demeanor and gestures of on-screen avatars, the appearance, size, brightness, color, or transparency of on-screen symbols, elements, or text, and sounds and/or music output by the game. These and other techniques are described in detail herein.

FIG. 3A is an exemplary table showing how a player's input on a guitar controller translates to audio output in at least one improvisation mode, according to some embodiments. FIG. 3A can, for example, show how the player's input translates to audio output while the player is playing in a solo improvisation mode. If the player executes a slow down strum (e.g., less than $8^{th}$ note speed) while holding 0 to 1 fret, and while holding the guitar level (e.g., not tilted), the rhythm-action game can output a single note in real time (e.g., not quantized), or possibly delayed to the next quantized position (e.g. the next $8^{th}$ note). The note can correspond to which fret is being held down—for instance, holding down one of the higher frets 220' can cause the game to output a higher note, while holding down one of the lower frets 220 can cause the game to output a lower note. Holding down a fret that is higher on a group of frets 220 (e.g., the first fret) can also result in a higher note than holding down a fret that is lower on the group of frets 220 (e.g., the third fret). The notes that correspond to each fret can vary depending on the background song being played, as well as the current position in the background song. In some embodiments, the notes that correspond to every fret on the guitar controller 200 will be musically compatible with the background song, e.g., compatible with the current key and chord of the song. In such embodiments, no matter which fret the player presses down, the note that is output will sound musically compatible with the background song. For instance, the first fret on a group of frets (e.g., 220, 220') can correspond to the root note of the current chord, the second fret can correspond to the third (e.g., a note three intervals above the root note), the third fret can correspond to the fifth (e.g., a note five intervals above the root note), and so on.

As the background song progresses and the current chord, and perhaps the current key, changes, at least some or all of the frets on the guitar controller 200 can be mapped to different chords or keys to reflect this change. For example, if a player strums the same fret at different points in the same song, the generated audio output may be at different chords or keys even though the player is strumming while holding down the same fret. Such a technique can therefore generate licks in the correct chord or key based on the user's strummed frets so that the generated audio output is based on the proper harmonic structure of the particular song.

If the player executes a slow up strum (e.g., less than $8^{th}$ note speed) while holding 0 to 1 fret, and while holding the guitar level, the rhythm-action game can output a single "bent" note. A bent note can be a musical note that is varied in pitch. On a real guitar, a bent note can be played by literally bending the string with excess finger pressure. In the improvised guitar playing feature, the rhythm-action game can output a "bent" note by outputting a note that varies slightly in pitch from a note that is output in response to a down strum.

If the player executes a slow down strum while holding down 2 to 4 frets, and while holding the guitar level, the rhythm-action game can output two, three, or four overlapping notes in real time (e.g., not quantized), or possibly delayed to the next quantized position (e.g., the next $8^{th}$ note), depending on whether the player is holding down 2, 3, or 4 frets, respectively. Once again, the notes that are played can correspond to which frets are being held down—higher frets can correspond to higher notes while lower frets can correspond to lower notes. As described above, the specific notes that are output can be mapped to the current key and chord of the song so that output notes remain musically compatible with the background song.

If the player executes $8^{th}$ note strumming (e.g., strumming at "approximately" the proper $8^{th}$ note speed, as described above) while holding down 0 to 1 frets, and while holding the guitar level, the rhythm-action game can output an $8^{th}$ note tremolo or a randomly selected $8^{th}$ note lick, depending on the embodiment. Therefore in some embodiments the system can be configured to provide some leeway for $8^{th}$ note strumming since the user need not be strumming exactly at $8^{th}$ notes. If the player executes $16^{th}$ note strumming (e.g., strumming at "approximately" the proper $16^{th}$ note speed, as described above) while holding down 0 to 1 frets, and while holding the guitar level, the rhythm-action game can output a $16^{th}$ note tremolo or a randomly selected $16^{th}$ note lick, depending on the embodiment. If the player executes $8^{th}$ note strumming while holding down 2 to 4 frets, and while holding the guitar level, the rhythm-action game can output a specific $8^{th}$ note lick depending on the frets which are held down. If the player executes $16^{th}$ note strumming while holding down 2 to 4 frets, and while holding the guitar level, the rhythm-action game can output a specific $16^{th}$ note lick.

During an improvised guitar passage, the system can include a predetermined set of licks that a player can play. Assuming a set of frets (220, 220') on a guitar controller has 5 frets (frets 1, 2, 3, 4, and 5), there will be 25 possible combinations of 2 to 4 frets that a player can press: (1, 2); (1, 3); (1, 4); (1, 5); (2, 3); (2, 4); (2, 5); (3, 4); (3, 5); (4, 5); (1, 2, 3); (1, 2, 4); (1, 2, 5); (1, 3, 4); (1, 3, 5); (1, 4, 5); (2, 3, 4); (2, 3, 5); (2, 4, 5); (3, 4, 5); (1, 2, 3, 4); (1, 2, 3, 5); (1, 2, 4, 5); (1, 3, 4, 5); and (2, 3, 4, 5). Each one of these 25 possible combinations can have a specific lick associated with it, including possibly different licks at the $8^{th}$ speed, the $16^{th}$ note speed, and the "fast" gibberish speed. These licks can vary depending on the background song, and/or on the player's current position in the background song, so that the generated licks are played in the right chord or key. If, as depicted in FIG. 2C, the guitar controller 200 has 5 lower frets 220 and 5 upper frets 220', combinations of upper frets 220' can play the same licks as those assigned to combinations of lower frets 220, but an octave higher. In other embodiments, the upper frets 220' can play different licks than those assigned to the lower frets 220.

In some embodiments, if the player executes any kind of strumming while holding down all lower frets or all upper frets simultaneously, the rhythm-action game can output random guitar noises (e.g., scrapes, squeals, etc.). If the player executes a single strum, then while holding down a fret and tapping higher frets with free fingers on the fretting hand and/or fingers on the strumming hand, the rhythm-action game can output tapping guitar noises. If the player does not strum but holds down any fret while tilting the guitar, the rhythm-action game can output guitar feedback noises. To execute this feedback sound, a player can first play a note (e.g., strum while holding down a single fret) while holding the guitar level, and then tilt the guitar while still holding the note. The rhythm-action game can be configured to cause the feedback to fade in after a second or two and loop until the player strums a new note. Feedback can be restricted to lower frets only, or it can be implemented with both lower- and upper-frets.

In some embodiments, the system monitors the player's input over a particular window of time to determine what audio output to generate. During the window, different inputs from the player can be used to generate the audio that is ultimately conveyed to the user during the gaming experience. The system can use the player's frets, rate of strumming, pattern of strumming, frequency of strumming, and/or any other player input to perform a look-up in a database that stores available notes or audio data. For example, the system can store all of the available notes for a guitar playing feature in a MIDI database and perform a database lookup based on the player's input, and perform audio effects modeling and synthesizing to customize the note to match that of the current musical composition. As another example, the database can store audio segments. The system can be configured to look up a particular audio segment based on the player's input. In some embodiments, the system can be configured to play back a particular audio segment (e.g., an audio segment for a particular tempo and/or key or chord). In some embodiments, the system can be configured to perform signal processing on the audio segment. For example, the system can perform time shifting or key shifting so that rather than storing each individual tempo and/or key or chord, the system can use a single audio segment to modify that segment into a range of different tempos and keys or chords.

In some embodiments, a player can choose to enable or disable the improvised guitar playing feature. If the player chooses to enable the improvised guitar playing feature, the rhythm-action game can implement the improvised guitar playing feature during select parts of a song. If the player chooses to disable the improvised guitar playing feature, the rhythm-action game can substitute other types of gameplay during the part of the song that would otherwise have implemented the improvised guitar playing feature.

In some embodiments, the improvised guitar playing feature can be implemented during a "breakdown" portion of a song. Breakdowns are sections of a song that can be extended by looping musical tracks and by scripting gameplay events. Breakdowns can be extended to play for longer if a player scores highly while playing an improvised guitar passage, according to the scoring mechanisms described in greater detail below. In one exemplary breakdown scenario, the breakdown section can begin with just a drum track for 8 bars. After some vocal/audience interaction, the bass track can enter. Additional vocal/audience interaction can ensue after the bass track enters. After a predetermined period (e.g., 4 or 8 bars), the improvised guitar playing feature can be turned on and the player can improvise a guitar passage for 8 bars. If the player and/or band are doing well (e.g., attain a score higher than a certain threshold, according to the scoring mechanisms described in greater detail below), the background song can be looped for an additional 8 bars to allow the player additional time to improvise/extend his or her improvised passage. Finally, the improvised passage ends and the main melody of the song is resumed. In another exemplary breakdown scenario, the breakdown section can begin with just a bass track and a drum track. After some vocal/audience interaction, the guitar and vocalist can trade licks. A player playing with a guitar controller can improvise a short lick (e.g., 1 or 2 bars) using the improvised guitar playing feature. The vocalist can then imitate that lick, such as by singing the melody of that lick back to the guitarist. Then the player playing with the guitar controller can improvise another short lick, which the vocalist again imitates. The player playing the guitar and the vocalist can trade back and forth a few times in this fashion before a big drum fill finishes the breakdown. Afterwards, the breakdown section ends and the main melody of the song is resumed.

The improvised guitar playing feature can also be implemented for an entire song so that a player can practice improvising over the entire song. By allowing the player an opportunity to improvise over the entire song, the rhythm-action game can give the player an opportunity to be creative by exploring new licks and combinations of licks, and to practice stringing together different musical phrases.

FIG. 3B is another exemplary table showing how a player's input on a guitar controller translates to audio output in at least one improvisation mode, according to some embodiments. FIG. 3B can, for example, show how the player's input translates to audio output while the player is playing in a rhythmic guitar improvisation mode. If the player executes a slow up or down strum (e.g., less than $8^{th}$ note speed) while holding 0 to 1 fret, the rhythm-action game can output a single note in real time (e.g., not quantized), or possibly delayed to the next quantized position (e.g., the next $8^{th}$ note). Similar to FIG. 3A, the note can correspond to which fret is being held down. Also similar to FIG. 3A, in some embodiments, the notes that correspond to every fret on the guitar controller 200 will be musically compatible with the background song, e.g., compatible with the current key and chord of the song.

If the player executes a slow up or down strum while holding two adjacent frets, the rhythm-action game can output a single palm muted power chord. When playing a real guitar instrument, "palm muting" refers to a technique where a player uses the base of his/her strumming hand's palm to lightly touch the strings while strumming, thereby producing a slightly softer, truncated sound relative to a regular strum. The presently disclosed rhythm-action game can allow players to simulate and reproduce this sound by pressing two adjacent frets while strumming. A power chord refers to a musical chord that consists of the root note and the fifth (e.g., a note 5 intervals up from the root).

If the player executes a slow up or down strum while holding two fret buttons with a single fret space between them (e.g., the player presses the first and third frets, or the second and fourth frets), the rhythm-action game can output a single power chord, without palm muting.

If the player executes a slow up or down strum while holding down three adjacent fret buttons, the rhythm-action game can output a single barre chord. When playing a real guitar, a barre chord (also known as a bar chord) is a type of chord that the musician plays by using one or more fingers to press down multiple strings across a single fret of the fingerboard, like a bar pressing down the strings. A player can simulate such a chord in a rhythm-action game by holding down three adjacent fret buttons while strumming.

If the player executes $8^{th}$ note strumming (e.g., strumming at "approximately" the proper $8^{th}$ note speed, as described above) while holding down two adjacent frets, the rhythm-action game can output an $8^{th}$ note stream of palm muted power chords. If the player executes $8^{th}$ note strumming while holding down two fret buttons with a single space between them (e.g., the player presses the first and third frets, or the second and fourth frets), the rhythm-action game can output an $8^{th}$ note stream of power chords. If the player executes $8^{th}$ note strumming while holding down three adjacent fret buttons, the rhythm-action game can output an $8^{th}$ note stream of barre chords.

If the player executes $8^{th}$ note strumming while pressing down frets one, two and four, or frets one, three and four, on either the lower fret buttons 220 or the higher fret buttons 220', the rhythm-action game can output an $8^{th}$ note arpeggio. An arpeggio can refer to a musical technique where notes in a chord are played in a sequence, one after the other, rather than ringing out simultaneously.

If the player executes $16^{th}$ note strumming while pressing down two adjacent fret buttons, the rhythm-action game can output a $16^{th}$ note stream of palm muted power chords. If the player executes $16^{th}$ note strumming while pressing down two fret buttons with a space between them, the rhythm-action game can output a $16^{th}$ note stream of power chords. If the player executes $16^{th}$ note strumming while pressing down three adjacent fret buttons, the rhythm-action game can output a $16^{th}$ note stream of barre chords.

If the player executes $16^{th}$ note strumming while pressing down frets one, two and four, or frets one, three and four, on either the lower fret buttons 220 or the higher fret buttons 220', the rhythm-action game can output a $16^{th}$ stream of top strings double stops. "Double stops" refers to a technique of playing two notes simultaneously on two separate strings on a stringed instrument, such as a guitar. They can also be thought of as a chord consisting of two notes. While double stops can be performed on any strings, in some embodiments, the rhythm-action game can output double stops can be performed on the "top" strings, e.g., the higher set of strings on a guitar neck, such as the B and high E strings on a guitar with standard tuning.

As described above, the way in which a particular player input maps to an audio output can vary depending on the improvisation mode the rhythm-action game is in. In some embodiments, the game can use the mapping discussed above in relation to FIG. 3A for solo improvisation modes, while the game can use the mapping discussed in relation to FIG. 3B for rhythmic-guitar improvisation modes. The game can switch between normal (e.g., non-improvised) mode, solo improvisation mode, and rhythmic guitar improvisation mode one or more times during the course of a single song, or across a set of songs.

In addition to allowing players to freely choose how to improvise, the rhythm-action game can also provide rough "cues" to the players to direct players to improvise within certain broad guidelines. By providing cues to prompt players to improvise in a certain way, the rhythm-action game can force players to explore different licks and modes of improvising, while also establishing an objective standard with which to score players' performance. For example, in a guitar solo mode, the rhythm-action game can direct players to sustain a high note, sustain a low note, strum a low note slowly, strum a high note slowly, strum a low note quickly, strum a high note quickly, implement feedback, or implement tapping. These guidelines can be rough guidelines only—for example, the cue to sustain a high note can be satisfied by sustaining any one of five high notes. Similarly, the cue to play a low $16^{th}$ note sequence can be satisfied by playing any of a plurality of $16^{th}$ note licks, wherein each lick can be selected by pressing different combinations of frets and strumming the bar at a $16^{th}$ speed or higher, as discussed above. By providing rough guidelines, but not providing specific guidance regarding specific notes, these guidelines constrain players to play within certain parameters, but still allow players sufficient freedom to create their own individual solos.

As another example, in a rhythmic guitar mode, the rhythm-action game can provide the players with a set of cues that appear simultaneously on the game display. The players can be directed to perform some or all of these cues within a certain period of time (e.g., within a 16 bar period), but in no particular prescribed order. As the players execute improvisation techniques associated with each cue, some aspect of gameplay may change. For instance, the cue associated with the successfully executed technique may change appearance (e.g., change color, size, shape, transparency, or may include additional symbols or elements). Also for instance, there may be a chime, whistle, applause, or other short sound that indicates successful completion of the cue. The more cues that a player can execute within the period of time, the higher the player's score may be. As yet another example, in a rhythmic guitar mode, the rhythm-action game may not provide players with any cues at all, but may still recognize when players have successfully completed different types of improvisation techniques. The more techniques that the player executes, the higher the player's score may be.

FIGS. 4A-4F illustrate exemplary cues that can be displayed by the rhythm-action game to prompt players to improvise within the afore-mentioned guidelines. In some embodiments, the cues depicted in FIGS. 4A-4F may be used in any of multiple improvisation modes, including both the rhythmic guitar mode as well as the solo mode. In some embodiments, some or all of the cues may be used in only some modes, or in only one mode, and not in other modes—for instance, the depicted cues may be used in only the solo mode but not the rhythmic guitar mode. In some embodiments, the same cues may have different meanings depending on which mode the rhythm action game is currently in.

FIG. 4A depicts an exemplary sustain low cue 402a and an exemplary sustain high cue 402b. The two cues are distinguished from one another by the color of the cue, as indicated by the vertical/horizontal hatching on sustain low cue 402a and the diagonal hatching on sustain high cue 402b. In some embodiments the sustain low cue 402a is blue and the sustain high cue 402b is orange. When the sustain low cue 402a is displayed, the player can be directed to sustain a "low" note, such as any of the notes corresponding to the "low" guitar frets 220. When the sustain high cue 402b is displayed, the player can be directed to sustain a "high" note, such as any of the notes corresponding to the "high" guitar frets 220'. In some implementations or improvisation modes, the player may be directed to sustain the note for as long as the sustain low cue 402a and the sustain high cue 402b is displayed in order to achieve full credit for executing this technique. In other implementations or improvisation modes, the player may be deemed to have successfully executed this technique if the player sustains the note for at least a minimum period of time, e.g., two notes, four notes, or other minimum period.

FIG. 4B depicts an exemplary slow low cue 412a and an exemplary slow high cue 412b. The two cues can be distinguished from one another by the color of the cue, as indicated by the different hatching styles of the two cues. In some embodiments the slow low cue 412a is blue and the slow high cue 412b is orange. When the slow low cue 412a is displayed, the player can be directed to strum at approximately an $8^{th}$ note speed while pressing down on one or more of the "low" guitar frets 220, and while keeping the guitar level. When the slow low cue 412b is displayed, the player can be directed to strum at approximately an $8^{th}$ note speed while pressing down on one or more of the "high" guitar frets 220', and while keeping the guitar level.

Figure 4D:
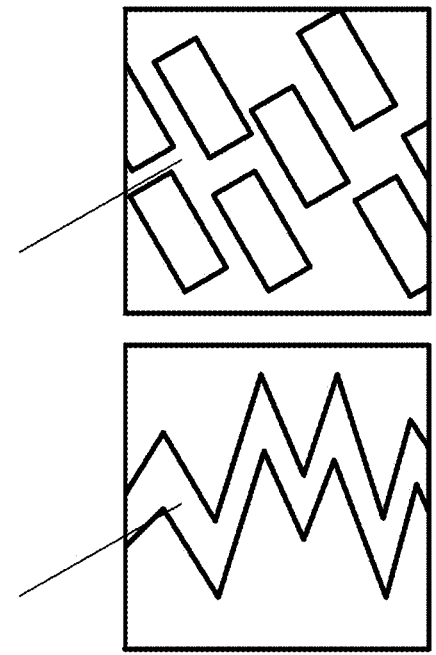
Figure 4C:
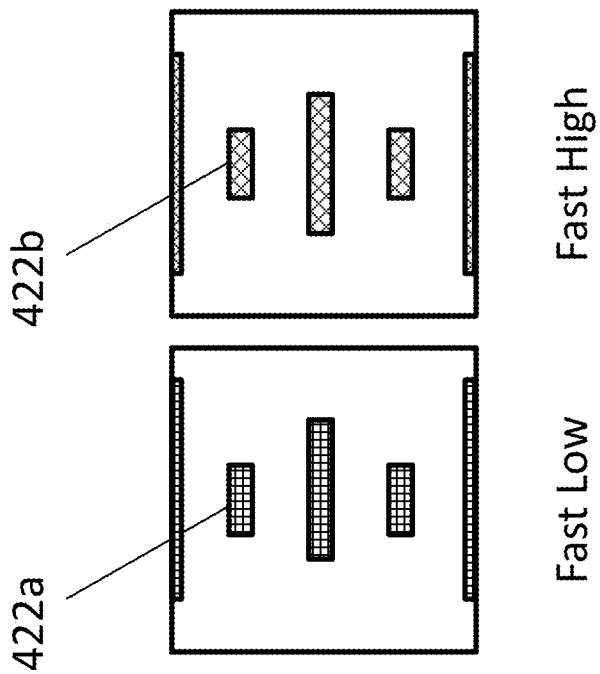

FIG. 4C depicts an exemplary fast low cue 422a and an exemplary fast high cue 422b. The two cues can be distinguished from one another by the color of the cue, as indicated by the different hatching styles of the two cues. In some embodiments the fast low cue 422a is blue and the fast high cue 422b is orange. When the fast low cue 422a is displayed, the player can be directed to strum at approximately a $16^{th}$ note speed while pressing down on one or more the "low" guitar frets 220, and while keeping the guitar level. When the fast high cue 422b is displayed, the player can be directed to strum at approximately a $16^{th}$ note speed while pressing down on one or more of the "high" guitar frets 220', and while keeping the guitar level.

FIG. 4D depicts an exemplary noise cue 432a and an exemplary tapping cue 432b. When the noise cue 432a is displayed, the player can be directed to play random guitar noises (e.g., scrapes, squeals, etc.). In some embodiments the noise cue 432a is blue and the tapping cue 432b is orange. As described above in relation to FIG. 3A, this can be done by, for example, strumming the strum bar at any speed while holding on to all of the lower frets 220. In some embodiments, random guitar noises can also be played by strumming the strum bar at any speed while holding on to all five of the lower frets 220, or all five of the upper frets 220'. When the tapping cue 432b is displayed, the player can be directed to play guitar tapping sounds. Again, as described above in relation to FIG. 3A, this can be done by, for example, executing single strums while holding on a fret and tapping the upper frets 220' with free fingers on the fretting hand and/or fingers on the strumming hand.

Figure 4F:
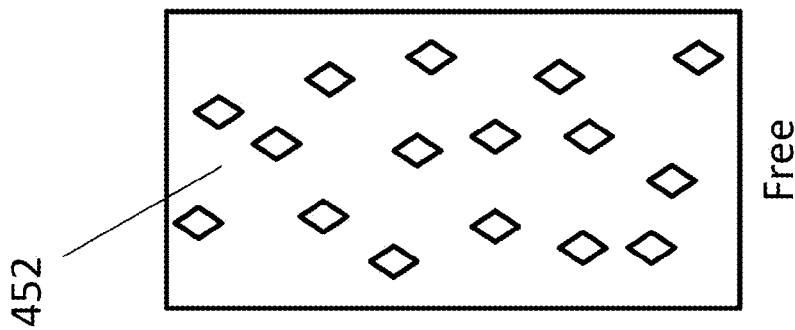
Figure 4E:
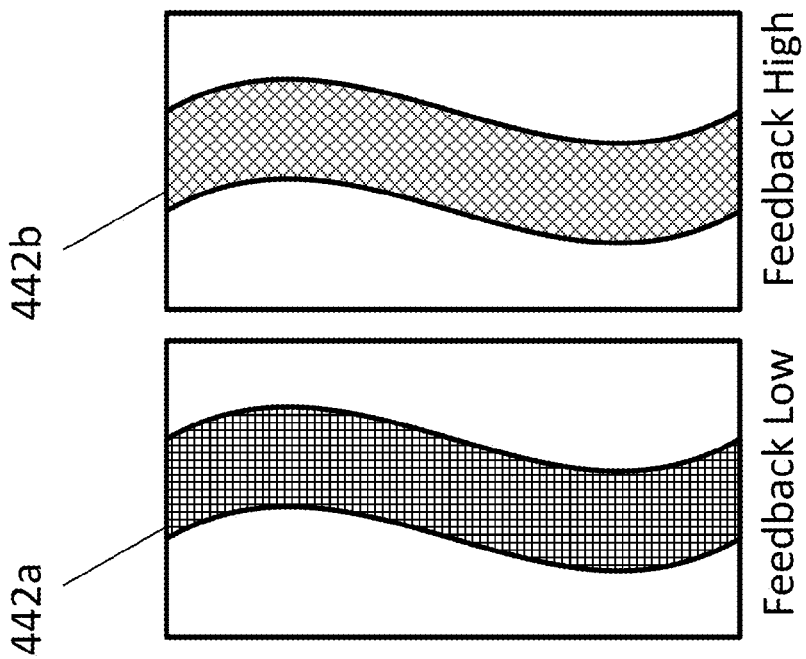

FIG. 4E depicts an exemplary feedback low cue 442a and an exemplary feedback high cue 442b. The two cues can be distinguished from one another by the color of the cue, as indicated by the different hatching styles of the two cues. In some embodiments the feedback low cue 442a is blue and the feedback high cue 442b is orange. When the feedback low cue 442a is displayed, the player can be directed to hold and sustain a low note (e.g., one of the notes associated with the lower frets 220) with feedback sound effects. As described above in relation to FIG. 3A, this can be done by, for example, first playing a note (e.g., by strumming while holding down a single fret) while holding the guitar level, and then tilting the guitar while still holding the note. The rhythm-action game can be configured to cause the feedback to fade in after a second or two and loop for as long as the player keeps the guitar tilted and keeps holding the same note down. The feedback can stop once the player strums a new note. When the feedback high cue 442b is displayed, the player can be directed to hold and sustain a high note (e.g., one of the notes associated with the higher frets 220') with feedback sound effects.

FIG. 4F depicts an exemplary "play whatever you want" cue 452. When the "play whatever you want" cue 452 is displayed, the player can be given the freedom to improvise in any manner the player chooses. For example, while the game can be configured to still play a sound based on the player's keyed frets and/or strumming regardless of the displayed cue (e.g., even if a player is not following the cue), the player may not score well if the player is not following the displayed cue. For cue 452 the player can improvise and input any desired frets and/or strumming and still score well.

Figure 5A:
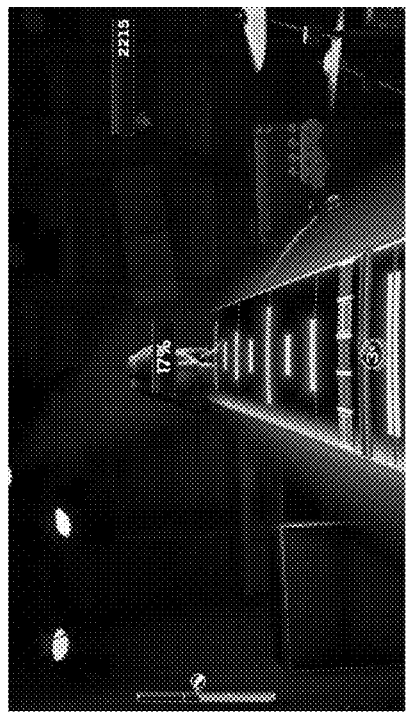
FIGS. 5A, 5B, 5C, and 5D depict exemplary in-game screenshots showing how the cues depicted in FIGS. 4A-4F can be displayed to the player.
Figure 5B:
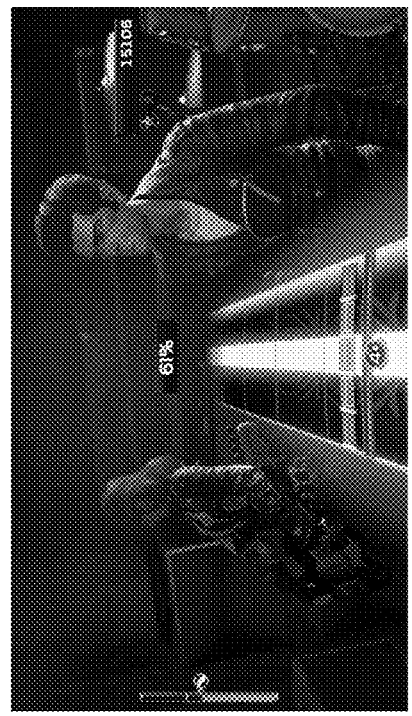
Figure 5C:
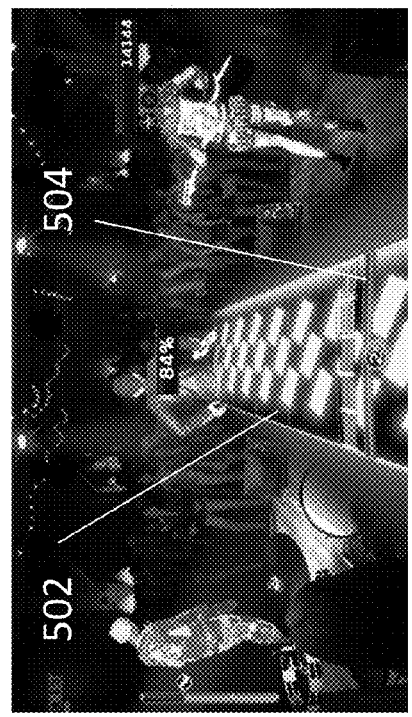
Figure 5D:
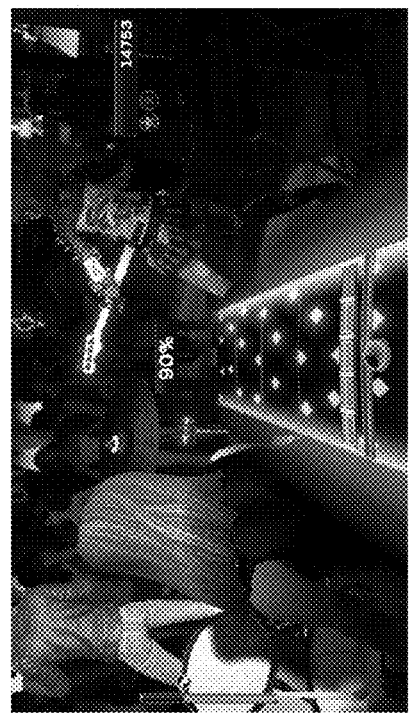

FIGS. 5A-5D depict exemplary in-game screenshots showing how the cues depicted in FIGS. 4A-4F can be displayed to the player. For example, FIG. 5A shows a tapping cue 432b displayed on a track 502 that appears to be moving towards the player. The player is tasked with playing whatever cue appears at the "now bar" 504. FIG. 5B shows a fast low cue 422a or a fast high cue 422b (depending on the color) displayed on the track 502; FIG. 5C shows a "play whatever you want" cue 452 displayed on the track 502, and FIG. 5D shows a sustain low cue 402a or a sustain high cue 402b (depending on the color) displayed on the track 502.

Other types of cues are also possible. For example, the rhythm action game may include additional cues that direct the player to play arpeggios, or to play different types of chords (e.g., palm muted or unmuted power chords, barre chords, major chords, and/or minor chords) In some embodiments, some or all of the cues described in FIGS. 4A-F through FIGS. 5A-5D may take on different meanings depending on which mode the game is in. For instance, the cues depicted in FIG. 4A may instruct the player to execute a "Sustain Low" technique while in solo mode (as described above), but may instruct the player to play a power chord while in the rhythmic guitar mode. In addition, some rhythm action game embodiments may also include "super cues" that correspond to a plurality of cues. A super cue can be a single symbol, visual element, or sound that directs the player to provide input that corresponds to a plurality of cues, either in a particular sequence, or in no particular sequence. By displaying only a single super cue instead multiple cues, the rhythm action game can save display space or time while directing the player to provide more complex inputs. The types of possible cues are not limited by the examples depicted in FIGS. 4A-F and FIGS. 5A-5D.

Figure 6:
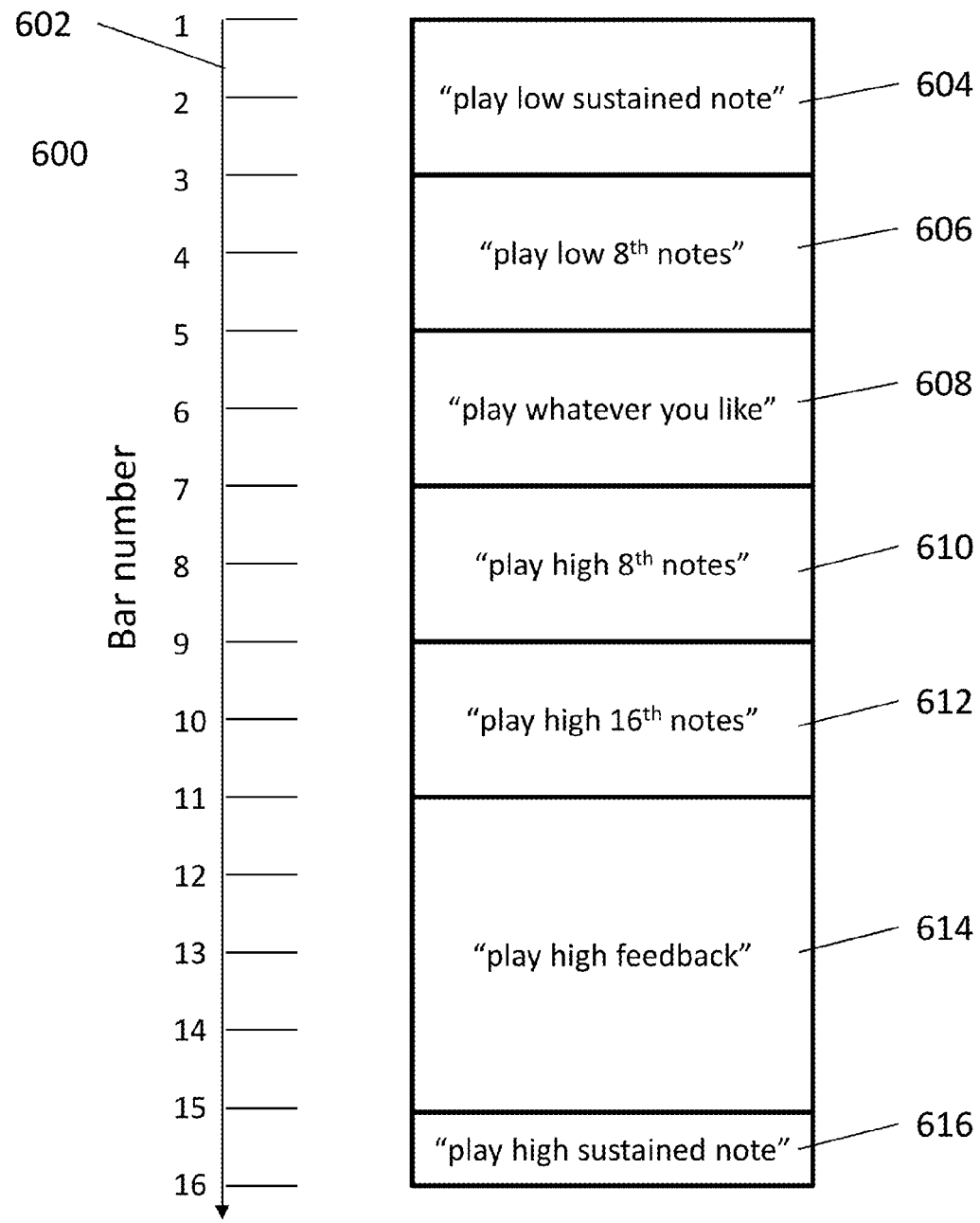
FIG. 6 depicts an exemplary 16-bar cued solo that illustrates how cues can be strung together to create a musical-sounding solo.

FIG. 6 depicts an exemplary 16-bar cued solo 600 that illustrates how the cues depicted in each of FIGS. 4A-4F can be strung together to create a musical-sounding solo, while the game is in the guitar solo improvisation mode. During the solo mode, portions of the musical composition can still be played in addition to the licks that are generated based on the player's input. For example, in some embodiments the original musical composition can be played in the background during the solo mode.

FIG. 6 includes a timeline 602 that depicts each successive bar in the 16-bar cued solo. From the first beat of bar 1 until the last beat of bar 2 (time block 604), the rhythm-action game can display the sustain low cue 402a, which directs the player to play and sustain a low note of the player's choosing. From the first beat of bar 3 to the last beat of bar 4 (time block 606), the rhythm-action game can display the slow low cue 412a, which directs the player to play low $8^{th}$ notes. From the first beat of bar 5 to the last beat of bar 6 (time block 608), the rhythm-action game can display the "play whatever you want" cue 452, which gives the player the freedom to improvise in any manner the player sees fit. From the first beat of bar 7 to the last beat of bar 8 (time block 610), the rhythm-action game can display the slow high cue 412b, which directs the player to play high $8^{th}$ notes. From the first beat of bar 9 to the last beat of bar 10 (time block 612), the rhythm-action game can display the fast high cue 422b, which directs the player to play high $16^{th}$ notes. From the first beat of bar 11 to the last beat of bar 14 (time block 614), the rhythm-action game can display the high feedback cue 514, which directs the player to play a high note with feedback. From the first to the last beat of bar 15 (time block 616), the rhythm-action game can display the sustain high cue 402b, which directs the player to play and sustain a high single note.

By showing and displaying cues at specific points in time, the rhythm-action game can provide rough guidance to the player directing the overall flow and direction of the solo, while still providing the player the freedom to choose the specific notes and licks the player would like to play. The 16-bar cued solo 600 illustrated in FIG. 6 is exemplary only and can be modified in many ways. For example, cued solos need not be 16 bars long, but may be 2 bars, 4 bars, 8 bars, or of any arbitrary length. The time blocks need not always begin on the first beat of a bar, but may start on the $1^{st}$ beat, $2^{nd}$ beat, $3^{rd}$ beat, $4^{th}$ beat, or at any time within a bar. The sequence of cues displayed in the 16-bar cued solo 600 can be modified by inserting additional cues, deleting cues, or rearranging cues to achieve a different musical flow. By modifying the sequence of cues by inserting more or less cues, or by inserting more or less complicated or intuitive cues, the difficulty of the cued solo can be adjusted to match the skill of the player.

In some embodiments, the rhythm-action game can also provide a mechanism for scoring the performance of an improvised guitar passage. This scoring mechanism can differ depending on which mode the song is in—in other words, the scoring mechanism can change throughout the course of a single song, or throughout the course of a set of songs. In a first set of scoring embodiments, the scoring can be done independently of any displayed cues—the score is based entirely on a player's unprompted, un-cued free-form performance ("free-form scoring"). Free-form scoring can include determining whether or not the player switches from one type of output (e.g., low sustained notes) to another type of output (e.g., high $8^{th}$ notes) at appropriate musical moments, such as at the boundary between two bars, on a musical beat, or on musical accents in the background song. Free-form scoring can also determine whether the player utilizes a wide variety of output types—the more output types (e.g., low $16^{th}$ notes, high $8^{th}$ notes, feedback, sustained notes, power chords, palm muted barre chords, etc.) the player utilizes, the higher the player's score can be. In some embodiments, free-form scoring can judge whether the player's choice of output types is appropriate for the background song. For example, $16^{th}$ note outputs, tapping outputs, and power chords can be more appropriate for rock metal songs, while long notes, bent notes, $8^{th}$ notes, and arpeggios can be more appropriate for ballads and slow songs. If the player emphasizes the right type of output for the background song, the free-form scoring mechanism can increase the player's score accordingly. Free-form scoring can also judge the player's form by determining if the player strings together output types in a musically appropriate way. Certain output types (e.g., high $16^{th}$ notes, high feedback) can be more appropriate for the peak of a musical crescendo, while other output types can be more appropriate for the beginning of a musical phrase, before a crescendo. By determining whether the player employs the right type of output at certain points in a musical phrase, the free-form scoring mechanism can increase the player's score accordingly. Free-form scoring can also award the player if the player strings together predetermined sequences of output types (e.g., tricks). For example, certain sequences of specific licks can be determined in advance, and if the player performs one of these sequences, the player can be awarded bonus points. Free-form scoring can also judge the player's use of repetition. Re-use of specific licks or sequences of output types, up to a certain threshold, can increase a player's score. Overly repetitious re-use of licks or sequences of output types, however, can decrease a player's score. In addition, free-form scoring can judge the player's use of the guitar's range. If the player utilizes the full range of the guitar's high and low notes, the player's score can increase. If, however, the player utilizes only a limited range, e.g., uses only low notes or only high notes, the player's score can decrease.

In some embodiments, the scoring can be done by judging how closely a player adheres to a set of displayed cues. The more closely a player adheres to the displayed cues, the higher the player's score can be. In addition to simply playing the correct output type corresponding to the cue, the scoring can also judge how closely the player adheres to the timing of output type changes. For example, if the player switches output types as close to the pre-authored boundary as possible, the player's score can increase.

In some embodiments, the rhythm action game can evaluate a player's improvisation by judging whether or not a player successfully executes an assigned set of displayed cues within a predetermined window of time. The player may have flexibility to execute the cues in any order he or she desires, but the more of the displayed cues the player can execute within the allotted time, the higher the player's score will be. Depending on how many of the displayed cues the player executes, the rhythm action game can change some aspect of gameplay. As discussed above, the rhythm action game can, for example, increase the player's score, decrease the player's score, change the appearance or motions of an avatar associated with the player, cause text, symbols or other visual elements to appear, disappear, brighten, change color, size, and/or transparency, or play sounds that indicate the player has successfully completed a cue, a certain number or proportion of cues, or has completed all the displayed cues.

FIG. 7 depicts an exemplary system 700 for implementing an improvised guitar playing feature in a rhythm-action game. The system 700 can accept at least four types of input: fret input 702, strumming input 704, tilt sensor input 706, and song position input 708. Fret input 702 can include information regarding which frets the player is currently holding down, and can be supplied, directly or indirectly, from guitar controller 200. Strumming input 704 can include information regarding the rate at which the player is strumming the strum bar 240. This information can include the real-time inputs from strum bar 240, and it can include processed data from strum bar 240 that indicates whether the player is strumming below $8^{th}$ note speed, at $8^{th}$ note speed, at $16^{th}$ note speed, or faster than $16^{th}$ note speed, and so on. Tilt sensor input 706 can include information regarding whether the player is tilting the guitar controller 200 or not. This information can be supplied by the tilt sensor on the guitar 200. The song position input 708 can include information regarding the background song that is currently playing as well as the player's current position within the background song. In some embodiments, the song position input 708 can also include information regarding the current key and chord of the background song. For example, MIDI data can be used to annotate a particular background song.

All four types of input can be supplied to a database 710 having a lookup table 712. In some embodiments, the database 710 and table 712 can comprise a MIDI database that encodes note information according to MIDI format. One of skill can appreciate that MIDI is used as an exemplary format, and that other data formats can be used without departing from the spirit of the techniques described herein. Table 712 can determine, based on at least one of the fret input 702, the strumming input 704, the tilt sensor input 706, and the song position input 708, a corresponding note or a plurality of notes 713. The notes 713 can vary depending on what frets the player is pressing down on, how fast the player is strumming, whether the player is tilting the guitar controller 200, and the current song position (e.g., which can indicate what improvisation mode, such as rhythmic guitar mode or solo mode, the rhythm action game is currently operating in). In some embodiments, the notes 713 are MIDI format information indicating a pure tone, such as G, D, or F. Furthermore, the notes 713 can be a sequence of notes that define a lick as opposed to single sustained notes.

The database 710 and table 712 can output the notes 713 to a sequencer 714. Sequencer 714 can convert the notes 713 into a series of messages that are sequenced in time. Sequencer 714 can also take as input at least one of the fret input 702, the strumming input 704, the tilt sensor input 706, and the song position input 708, and determine the proper sequence of notes in time based on one or more of those inputs. Sequencer 714 can also be configured to transpose the notes 713 into a different key depending on the key of the current part of the song. The output of sequencer 714 can be note-on and note-off messages 715 (e.g., that are potentially also transposed to a different key than notes 713) that are sent to the synthesizer 716, and can instruct the synthesizer 716 when to play certain notes and when to stop playing said notes. Note-on and note-off messages 715 can also include volume, pitch-bend and other messages (e.g., as found in the MIDI specification). Sequencer 714 can "quantize" the notes 713 into a particular rhythm to match the background song's tempo and beat. For instance, if the strumming input 704 indicates that the player is strumming slowly, table 712 can choose a single note 713 and the sequencer will send a message corresponding to that note immediately to synthesizer 716, which can output audio signals in real time (e.g., at the same time as each actuation of the strum bar 240) or possibly delayed to the next quantized position (e.g., the next $8^{th}$ note). If the strumming input 704 indicates that the player is strumming at approximately $8^{th}$ note speed, $16^{th}$ note speed, or at an extremely fast "gibberish" speed, as described above, table 712 can choose an $8^{th}$ note lick, $16^{th}$ note lock, or "gibberish" style lick (713) and will send that to the sequencer. The sequencer 714 can then sequence the set of notes in the lick in time so that the synthesizer 716 can output audio signals not at the exact moment that the player actuates the strum bar 240, but at points in time that would coincide with the rhythmic pulse of the background song.

Note-on and note-off messages 715 can be passed to the synthesizer 716, which can convert the messages 715 into an audio signal 717 that sounds like a particular instrument (e.g., acoustic guitar, electric guitar, or guitar feedback). The synthesizer 716 can accept as input any one or more of the fret input 702, the strumming input 704, the tilt sensor input 706, and the song position input 708. In some embodiments, the particular instrument sound is determined by settings in the song's game file or MIDI file. In some embodiments, the particular instrument sound can be selected by the user, based on the guitar controller's input buttons (including, but not limited to, inputs on the guitar's fret input, strumming input, and/or tilt input).

The audio signals 717 output from the synthesizer 716 can be sent to an audio effects generator 718. The audio effects generator 718 can amplify the audio signals to an appropriate volume, and can also add audio effects such as distortion, reverb, echo, wah, etc. The choice of whether and which audio effects to apply can also be determined by the setting of a 5-way switch (not shown) on the guitar controller 200. For example, if the player plays while the 5-way switch is in position 1, there are no added audio effects. If the player plays with the 5-way switch in position 2 through 5, there may be added distortion, echo, wah, chorus or other audio effects. If the player is executing single strums while holding onto the upper frets 220' and while tilting the guitar, the audio effects generator 718 can be configured to implement tapping-style effects to the audio signals 717. The audio effects generator 718 can also determine not to implement any audio effects at all. The output of the audio effects generator 718 can then be sent to a speaker 719, which converts the audio signal into audible sound.

The above-described improvised guitar playing feature in a rhythm-action game can be enabled or disabled by the player globally, such that it is implemented or not implemented for all songs that the player plays on the rhythm-action game thereafter. In other embodiments, players can be given an option to enable or disable the improvised guitar playing feature before starting on a specific song. In yet other embodiments, the improvised guitar playing feature can be enabled or disabled while the player is in the middle of playing a selected song. This can be done by having the player actuate a specific switch or sequence of switches on the guitar controller while in the middle of a song. In yet other embodiments, the player can choose to play an entire song using only the improvised guitar playing feature. In some embodiments, the improvised guitar playing feature can become available to the player only after the player has "unlocked" the feature by completing a certain set of tasks in the rhythm-action game, or by achieving a certain minimum threshold achievement score.

The above-described techniques can be implemented in digital electronic circuitry, or in computer hardware, firmware, software, or in combinations of them. The implementation can be as a computerized method or process, or a computer program product, i.e., a computer program tangibly embodied in a machine-readable storage device, for execution by, or to control the operation of, data processing apparatus, e.g., a programmable processor, a computer, a game console, or multiple computers or game consoles. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or game console or on multiple computers or game consoles at one site or distributed across multiple sites and interconnected by a communication network.

Method steps can be performed by one or more programmable processors executing a computer or game program to perform functions of the invention by operating on input data and generating output. Method steps can also be performed by, and apparatus can be implemented as a game platform such as a dedicated game console, e.g., PLAYSTATION®3, PLAYSTATION®4, or PLAYSTATION®VITA manufactured by Sony Computer Entertainment, Inc.; WII™, WII U™, NINTENDO 2DS™, or NINTENDO 3DS™ manufactured by Nintendo Co., Ltd.; or XBOX®, XBOX 360®, or XBOX ONE® manufactured by Microsoft Corp.; or special purpose logic circuitry, e.g., an FPGA (field programmable gate array) or an ASIC (application-specific integrated circuit) or other specialized circuit. Modules can refer to portions of the computer or game program or gamer console and/or the processor/special circuitry that implements that functionality.

Processors suitable for the execution of a computer program include, by way of example, both general and special purpose microprocessors, and any one or more processors of any kind of digital computer or game console. Generally, a processor receives instructions and data from a read-only memory or a random access memory or both. The essential elements of a computer or game console are a processor for executing instructions and one or more memory devices for storing instructions and data. Generally, a computer also includes, or is operatively coupled, to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a player, the above described techniques can be implemented on a computer or game console having a display device, e.g., a CRT (cathode ray tube) or LCD (liquid crystal display) monitor, a television, or an integrated display, e.g., the display of a PLAYSTATION®VITA or Nintendo 3DS. The display can in some instances also be an input device such as a touch screen. Other typical inputs include simulated instruments, microphones, or game controllers. Alternatively, input can be provided by a keyboard and a pointing device, e.g., a mouse or a trackball, by which the player can provide input to the computer or game console. Other kinds of devices can be used to provide for interaction with a player as well; for example, feedback provided to the player can be any form of sensory feedback, e.g., visual feedback, auditory feedback, or tactile feedback; and input from the player can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer or game console having a graphical player interface through which a player can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing/gaming system can include clients and servers or hosts. A client and server (or host) are generally remote from each other and typically interact through a communication network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Some aspects of the inventions described herein are reflected in the following claims, but the inventions are not limited to these. Specifically there are apparatuses configured to carry out the steps of the following methods, apparatuses whose components embody the claim elements below and there are computer program products, tangible embodied in a computer-readable storage medium, which includes instructions operable to cause a data processing apparatus to perform the following methods.

The invention claimed is:

1. A method for evaluating with at least one processor a player's musical improvisation in a rhythm-action game, the method comprising:

receiving, from a controller in communication with at least one processor, at least one note input and at least one rhythm input;

determining, by the at least one processor, an improvised musical passage based on the at least one note input and the at least one rhythm input, the improvised musical passage having at least one note with a pitch and at least one rhythm with a tempo;

evaluating, by the at least one processor, the improvised musical passage to determine whether a set of target notes includes a target pitch that corresponds to the pitch of the at least one note of the improvised musical passage, and whether a set of target rhythms includes a target tempo that corresponds to the tempo of the at least one rhythm of the improvised musical passage; and changing, by the at least one processor, an aspect of gameplay based on the evaluation.

2. The method of claim 1, wherein the set of target notes and the set of target rhythms are associated with a cue, and the method further comprises transmitting, by the at least one processor, display data comprising the cue to a display.

3. The method of claim 1, wherein the controller is a simulated guitar controller that has a plurality of fret buttons, and wherein the at least one note input corresponds to an activation of at least one fret button of the plurality of fret buttons.

4. The method of claim 3, wherein
the simulated guitar controller has a strum bar;
the at least one rhythm input corresponds to at least one activation of the strum bar; and
the tempo of the at least one rhythm of the improvised musical passage is based on a rate at which the strum bar is activated.

5. The method of claim 4, wherein the determining of the improvised musical passage comprises selecting a real time rhythm when the tempo is below a speed threshold, and selecting a quantized rhythm when the tempo is above the speed threshold.

6. The method of claim 1, wherein:
the set of target notes comprises a first subset of target notes and a second subset of target notes;
the set of target rhythms comprises a first subset of target rhythms and a second subset of target rhythms; and
the method further comprises:
changing, by the at least one processor, the aspect of gameplay in a first way when the first subset of target notes includes a first target pitch that corresponds to the pitch of the at least one note of the improvised musical passage, and the first subset of target rhythms includes a first target tempo that corresponds to the tempo of the at least one rhythm of the improvised musical passage; and
changing, by the at least one processor, the aspect of gameplay in a second way when the second subset of target notes includes a second target pitch that corresponds to the pitch of the at least one note of the improvised musical passage, and the second subset of target rhythms includes a second target tempo that corresponds to the tempo of the at least one rhythm of the improvised musical passage.

7. The method of claim 6, wherein:
the first subset of target notes and the first subset of target rhythms are associated with a first cue;
the second subset of target notes and the second subset of target rhythms are associated with a second cue; and the method further comprises transmitting, by the at least one processor, display data comprising the first cue and the second cue to a display.

8. Non-transitory computer readable media for enabling at least one processor to evaluate a player's musical improvisation in a rhythm-action game, the media storing machine-readable instructions that are configured to, when executed by the at least one processor, cause the at least one processor to:
receive, from a controller, at least one note input and at least one rhythm input;
determine an improvised musical passage based on the at least one note input and the at least one rhythm input, the improvised musical passage having at least one note with a pitch and at least one rhythm with a tempo;
evaluate the improvised musical passage to determine whether a set of target notes includes a target pitch that corresponds to the pitch of the at least one note of the improvised musical passage, and whether a set of target rhythms includes a target tempo that corresponds to the tempo of the at least one rhythm of the improvised musical passage; and
change an aspect of gameplay based on the evaluation.

9. The non-transitory computer readable media of claim 8, wherein the set of target notes and the set of target rhythms are associated with a cue, and the instructions are further configured to cause the at least one processor to transmit display data comprising the cue to a display.

10. The non-transitory computer readable media of claim 8, wherein the instructions are configured to cause the at least one processor to change the aspect of gameplay by changing a score of the player based on the evaluation.

11. The non-transitory computer readable media of claim 8, wherein the controller is a simulated guitar controller.

12. The non-transitory computer readable media of claim 11, wherein the simulated guitar controller has a plurality of fret buttons, and wherein the at least one note input corresponds to an activation of at least one fret button of the plurality of fret buttons.

13. The non-transitory computer readable media of claim 11, wherein
the simulated guitar controller has a tilt sensor configured to sense a tilt of the simulated guitar controller; and
the instructions are configured to cause the at least one processor to determine the improvised musical passage based at least in part on the sensed tilt of the simulated guitar controller.

14. The non-transitory computer readable media of claim 11, wherein:
the simulated guitar controller has a strum bar, and
wherein the at least one rhythm input corresponds to at least one activation of the strum bar.

15. The non-transitory computer readable media of claim 14, wherein the instructions are configured to cause the at least one processor to determine the tempo of the at least one rhythm of the improvised musical passage based on a rate at which the strum bar is activated.

16. The non-transitory computer readable media of claim 15, wherein the instructions are configured to cause the at least one processor to determine the improvised musical passage by selecting a real time rhythm when the tempo is below a speed threshold, and by selecting a quantized rhythm when the tempo is above the speed threshold.

17. The non-transitory computer readable media of claim 8, wherein:
the set of target notes comprises a first subset of target notes and a second subset of target notes;
the set of target rhythms comprises a first subset of target rhythms and a second subset of target rhythms; and
the instructions are further configured to cause the at least one processor to:
change the aspect of gameplay in a first way when the first subset of target notes includes a first target pitch that corresponds to the pitch of the at least one note of the improvised musical passage, and the first subset of target rhythms includes a first target tempo that corresponds to the tempo of the at least one rhythm of the improvised musical passage; and
change the aspect of gameplay in a second way when the second subset of target notes includes a second target pitch that corresponds to the pitch of the at least one note of the improvised musical passage, and the second subset of target rhythms includes a second target tempo that corresponds to the tempo of the at least one rhythm of the improvised musical passage.

18. The non-transitory computer readable media of claim 17, wherein:
the first subset of target notes and the first subset of target rhythms are associated with a first cue;
the second subset of target notes and the second subset of target rhythms are associated with a second cue; and
the instructions are further configured to cause the at least one processor to transmit display data comprising the first cue and the second cue to a display.

19. A computer system for evaluating a player's musical improvisation in a rhythm-action game, the computer system comprising at least one processor configured to:
receive, from a controller, at least one note input and at least one rhythm input;
determine an improvised musical passage based on the at least one note input and the at least one rhythm input, the improvised musical passage having at least one note with a pitch and at least one rhythm with a tempo;
evaluate the improvised musical passage to determine whether a set of target notes includes a target pitch that corresponds to the pitch of the at least one note of the improvised musical passage, and whether a set of target rhythms includes a target tempo that corresponds to the tempo of the at least one rhythm of the improvised musical passage; and
change an aspect of gameplay based on the evaluation.

20. The computer system of claim 19, wherein the set of target notes and the set of target rhythms are associated with a cue, and the at least one processor is further configured to transmit display data comprising the cue to a display.

* * * * *